(12) United States Patent
Jang et al.

(10) Patent No.: US 11,700,644 B2
(45) Date of Patent: Jul. 11, 2023

(54) METHOD AND APPARATUS FOR PERFORMING RANDOM ACCESS IN WIRELESS COMMUNICATION SYSTEM

(71) Applicant: Samsung Electronics Co., Ltd., Suwon-si (KR)

(72) Inventors: Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 17/323,336

(22) Filed: May 18, 2021

(65) Prior Publication Data

US 2021/0360702 A1 Nov. 18, 2021

(30) Foreign Application Priority Data

May 18, 2020 (KR) ........................ 10-2020-0059323

(51) Int. Cl.
*H04W 74/08* (2009.01)
*H04W 74/00* (2009.01)
(Continued)

(52) U.S. Cl.
CPC ... *H04W 74/0833* (2013.01); *H04W 36/0072* (2013.01); *H04W 52/0216* (2013.01);
(Continued)

(58) Field of Classification Search
CPC ......... H04W 36/0072; H04W 36/0077; H04W 52/0216; H04W 72/21; H04W 74/006;
(Continued)

(56) References Cited

U.S. PATENT DOCUMENTS 10,034,308 B2\* 7/2018 Lee ........................ H04W 72/21
10,349,348 B2\* 7/2019 Yi ...................... H04W 74/0833
(Continued)

FOREIGN PATENT DOCUMENTS

KR  10-2020-0036797 A  4/2020
KR  10-2021-0000227 A  1/2021

OTHER PUBLICATIONS

Samsung, Miscellaneous corrections on eMIMO, R2-2003911, 3GPP TSG-RAN WG2 Meeting #109bis-e, May 13, 2020.
(Continued)

*Primary Examiner* — Liton Miah
(74) *Attorney, Agent, or Firm* — Jefferson IP Law, LLP

(57) ABSTRACT

A terminal in a wireless communication system is provided. The terminal includes a transceiver, and at least one processor configured to receive, from BS, a RRC reconfiguration message including a reconfiguration with synchronization, transmit, to the BS, a first message including a PRACH, a PUSCH, and a C-RNTI MAC CE based on the reconfiguration with synchronization, control the transceiver to receive, from the BS, a first PDCCH and a PDSCH, wherein: for the case when the BS receives the PRACH and does not receive the PUSCH, the first PDCCH is a PDCCH addressed to RA-RNTI and the PDSCH includes a fallback RAR; and for the case when the BS receives the PUSCH, the first PDCCH is a PDCCH addressed to a C-RNTI corresponding to the C-RNTI MAC CE and the PDSCH includes an absolute timing advance command MAC CE, determine that a RAR reception is successful based on the at least one of the fallback RAR or the PDSCH, when a DRX is configured for the terminal via a RRC signalling, determine that active time for the DRX includes a time while a second PDCCH indicating new transmission addressed to a C-RNTI corresponding to the C-RNTI MAC CE has not been received
(Continued)

after determining that the RAR reception is successful, and monitor the second PDCCH during the active time.

20 Claims, 9 Drawing Sheets

(51) Int. Cl.
    *H04W 36/00* (2009.01)
    *H04W 72/04* (2023.01)
    *H04W 52/02* (2009.01)
    *H04W 72/21* (2023.01)
(52) U.S. Cl.
    CPC ......... *H04W 72/21* (2023.01); *H04W 74/006* (2013.01); *H04W 74/0891* (2013.01)
(58) Field of Classification Search
    CPC ......... H04W 74/0833; H04W 74/0891; H04W 76/20; H04W 76/28; Y02D 30/70
    See application file for complete search history.

(56) References Cited

U.S. PATENT DOCUMENTS

| | | | |
|---|---|---|---|
| 2018/0116000 A1* | 4/2018 | Ly | H04W 74/0833 |
| 2018/0198646 A1* | 7/2018 | Gau | H04L 25/0202 |
| 2020/0053778 A1 | 2/2020 | Babaei et al. | |
| 2020/0107369 A1 | 4/2020 | Jeon et al. | |
| 2020/0107372 A1 | 4/2020 | Agiwal et al. | |
| 2020/0260497 A1* | 8/2020 | Ozturk | H04W 74/0833 |
| 2021/0051707 A1* | 2/2021 | Rastegardoost | H04L 5/0051 |
| 2022/0159737 A1* | 5/2022 | Jeon | H04W 74/006 |

OTHER PUBLICATIONS

Nokia et al., Stage-2 running CR for 2-step RACH, 3GPP TSG-RAN WG2 Meeting #109-e, R2-2000942, Feb. 13, 2020.
International Search Report dated Aug. 18, 2021, issued in International Application No. PCT/KR2021/006205.

* cited by examiner

METHOD AND APPARATUS FOR PERFORMING RANDOM ACCESS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0059323, filed on May 18, 2020, in the Korean Intellectual Property Office, the disclosure of which is incorporated by reference herein in its entirety.

BACKGROUND

1. Field

The disclosure relates to a wireless communication system. More particularly, the disclosure relates to a method of operating discontinuous reception (DRX) when a 2-step random access is used.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why 5G communication systems or pre-5G communication systems are called beyond 4G network communication systems or post long term evolution (LTE) systems. Implementation of 5G communication systems in an ultra-high frequency (millimeter wave (mmWave)) band (such as a 60-GHz band) is under consideration to achieve high data rates. To mitigate path loss of radio waves and increase transmission distance of radio waves in an ultra-high frequency band for 5G communication systems, various technologies such as beamforming, massive multiple-input multiple-output (massive MIMO), full dimensional MIMO (FD-MIMO), array antennas, analog beamforming, and large-scale antennas are being studied. Also, in order to improve system network performance for 5G communication systems, various technologies have been developed, e.g., evolved small cells, advanced small cells, cloud radio access networks (cloud-RAN), ultra-dense networks, device-to-device communication (D2D), wireless backhaul, moving networks, cooperative communication, coordinated multi-points (CoMP), and interference cancellation. In addition, for 5G systems, advanced coding modulation (ACM) schemes such as hybrid frequency shift keying (FSK) and quadrature amplitude modulation (QAM) modulation (FQAM) and sliding window superposition coding (SWSC) and advanced access techniques such as filter bank multi-carrier (FBMC), non-orthogonal multiple access (NOMA), sparse code multiple access (SCMA), etc. are being developed.

Moreover, the Internet has evolved from a human-centered connection network, in which humans create and consume information, to an Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In the IoT environment, intelligent information technology (IT) services may be provided to collect and analyze data obtained from objects connected to each other to create new value in human life. As existing IT techniques and various industries converge and combine with each other, the IoT may be applied to various fields, such as smart homes, smart buildings, smart cities, smart cars or connected cars, smart grids, health care, smart home appliances, high quality medical services, etc.

Accordingly, various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud-RAN as a big data processing technology described above may be an example of convergence of 5G communication technology and IoT technology.

In particular, with the development of wireless communication systems, methods of efficiently operating discontinuous reception (DRX) are in demand.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of operating discontinuous reception (DRX) when a 2-step random access is used.

Additional aspects will be set forth in part in the description which follows and, in part, will be apparent from the description, or may be learned by practice of the presented embodiments.

In accordance with an aspect of the disclosure, a terminal in a wireless communication system is provided. The terminal includes a transceiver, and at least one processor configured to control the transceiver to receive, from a base station (BS), a radio resource control (RRC) reconfiguration message including a reconfiguration with synchronization, control the transceiver to transmit, to the BS, a first message including a physical random access channel (PRACH), a physical uplink shared channel (PUSCH), and a cell radio network temporary identity (C-RNTI) medium access control (MAC) control element (CE) based on the reconfiguration with synchronization, control the transceiver to receive, from the BS, a first physical downlink control channel (PDCCH) and a physical downlink shared channel (PDSCH), wherein: for the case when the BS receives the PRACH and does not receive the PUSCH, the first PDCCH is a PDCCH addressed to random access RNTI (RA-RNTI) and the PDSCH includes a fallback random access response (RAR); and for the case when the BS receives the PUSCH, the first PDCCH is a PDCCH addressed to a C-RNTI corresponding to the C-RNTI MAC CE and the PDSCH includes an absolute timing advance command MAC CE, determine that RAR reception is successful based on the at least one of the fallback RAR or the PDSCH, determine that a RAR reception is successful based on the at least one of the fallback RAR or the PDSCH, when a discontinuous reception (DRX) is configured for the terminal via a RRC signalling, determine that active time for the DRX includes a time while a second PDCCH indicating new transmission addressed to a C-RNTI corresponding to the C-RNTI MAC CE has not been received after determining that the RAR reception is successful, and monitor the second PDCCH during the active time.

The reconfiguration with synchronization may include at least one of a terminal identity, timer information, or resource information for random access, and the resource information for random access may include at least one of first dedicated resource information for contention-free 4-step random access including first synchronization signal block (SSB) resource information, or second dedicated resource information for contention-free 2-step random access including second SSB resource information and resource information for the PUSCH of the first message.

The at least one processor may be further configured to determine to perform a 2-step random access procedure when the terminal receives, from the BS, both resource information for 4-step random access and resource information for 2-step random access and first reference signal received power (RSRP) of downlink pathloss reference signal is above a first RSRP threshold configured by the BS, the terminal receives, from the BS, the resource information for 2-step random access and does not receive the resource information for 4-step random access, or the reconfiguration with synchronization includes dedicated resource information for contention-free 2-step random access.

The reconfiguration with synchronization may include dedicated resource information for contention-free 4-step random access, and the at least one processor may be further configured to determine to perform a 4-step random access procedure.

The reconfiguration with synchronization may include second dedicated resource information for contention-free 2-step random access including second SSB resource information associated with a plurality of SSBs, and the at least one processor may be further configured to identify whether at least one SSB with a second RSRP above a second RSRP threshold among the plurality of SSBs is available, when the at least one SSB with the second RSRP above the second RSRP threshold among the plurality of SSBs is available, determine to perform contention-free random access, and when the at least one SSB with the second RSRP above the second RSRP threshold among the plurality of SSBs is not available, determine to perform contention-based random access.

The reconfiguration with synchronization may indicate a handover command.

In accordance with another aspect of the disclosure, a base station (BS) in a wireless communication system is provided. The base station includes a transceiver, and at least one processor configured to control the transceiver to transmit, to a terminal, a radio resource control (RRC) reconfiguration message including a reconfiguration with synchronization, control the transceiver to receive, from the terminal, a first message including a cell radio network temporary identity (C-RNTI) medium access control (MAC) control element (CE) based on the reconfiguration with synchronization, identify whether the BS receives at least one of a physical random access channel (PRACH) or a physical uplink shared channel (PUSCH) via the first message, when the BS receives the PRACH and the PUSCH, control the transceiver to transmit, to the terminal, a third message including a first physical downlink control channel (PDCCH) and a physical downlink shared channel (PDSCH) including an absolute timing advance command MAC CE, when the BS receives the PRACH and does not receive the PUSCH, control the transceiver to transmit, to the terminal, a fallback random access response (RAR), and control the transceiver to transmit, to the terminal, a second PDCCH, the second PDCCH is received by the terminal configured with a discontinuous reception (DRX) during active time, and the active time includes a time while the second PDCCH indicating new transmission addressed to a C-RNTI corresponding to the C-RNTI MAC CE has not been received after determining by the terminal that the RAR reception is successful.

The reconfiguration with synchronization may include at least one of a terminal identity, timer information, or resource information for random access, and the resource information for random access may include at least one of first dedicated resource information for contention-free 4-step random access including first synchronization signal block (SSB) resource information, or second dedicated resource information for contention-free 2-step random access including second SSB resource information and resource information for the PUSCH of the first message.

The terminal may perform a 2-step random access procedure when the terminal receives, from the BS, both resource information for 4-step random access and resource information for 2-step random access and first reference signal received power (RSRP) of downlink pathloss reference signal is above a first RSRP threshold configured by the BS, the terminal receives, from the BS, the resource information for 2-step random access and does not receive the resource information for 4-step random access, or the reconfiguration with synchronization includes dedicated resource information for contention-free 2-step random access.

The terminal may perform a 4-step random access procedure when the reconfiguration with synchronization includes dedicated resource information for contention-free 4-step random access.

The reconfiguration with synchronization may include second dedicated resource information for contention-free 2-step random access including second SSB resource information associated with a plurality of SSBs, the terminal may perform contention-free random access when at least one SSB with a second RSRP above a second RSRP threshold among the plurality of SSBs is available, and the terminal may perform contention-based random access when the at least one SSB with the second RSRP above the second RSRP threshold among the plurality of SSBs is not available.

The reconfiguration with synchronization may indicate a handover command.

In accordance with another aspect of the disclosure, a method, performed by a terminal, in a wireless communication system is provided. The method includes receiving, from a base station (BS), a radio resource control (RRC) reconfiguration message including a reconfiguration with synchronization, transmitting, to the BS, a first message including a physical random access channel (PRACH), a physical uplink shared channel (PUSCH), and a cell radio network temporary identity (C-RNTI) medium access control (MAC) control element (CE) based on the reconfiguration with synchronization, in case that the BS receives the PRACH and does not receive the PUSCH, receiving, from the BS, a fallback random access response (RAR), in case that the BS receives the PRACH and the PUSCH, control the transceiver to receive, from the BS, a first physical downlink control channel (PDCCH) and a physical downlink shared channel (PDSCH) including an absolute timing advance command MAC CE, determining that a RAR reception is successful based on the at least one of the fallback RAR or the PDSCH, when a discontinuous reception (DRX) is configured for the terminal via a RRC signalling, determining that active time for the DRX includes a time while a second PDCCH indicating new transmission addressed to a C-RNTI corresponding to the C-RNTI MAC CE has not been received after determining that the RAR reception is successful, and monitoring the second PDCCH during the active time.

The reconfiguration with synchronization may include at least one of a terminal identity, timer information, or resource information for random access, and the resource information for random access may include at least one of first dedicated resource information for contention-free 4-step random access including first synchronization signal block (SSB) resource information, or second dedicated resource information for contention-free 2-step random access including second SSB resource information and resource information for the PUSCH of the first message.

The method may further include determining to perform a 2-step random access procedure when the terminal receives, from the BS, both resource information for 4-step random access and resource information for 2-step random access and first reference signal received power (RSRP) of downlink pathloss reference signal is above a first RSRP threshold configured by the BS, the terminal receives, from the BS, the resource information for 2-step random access and does not receive the resource information for 4-step random access, the reconfiguration with synchronization includes dedicated resource information for contention-free 2-step random access.

The reconfiguration with synchronization may include second dedicated resource information for contention-free 2-step random access including second SSB resource information associated with a plurality of SSBs, and the method may further include: identifying whether at least one SSB with a second RSRP above a second RSRP threshold among the plurality of SSBs is available, when the at least one SSB with the second RSRP above the second RSRP threshold among the plurality of SSBs is available, determining to perform contention-free random access, and when the at least one SSB with the second RSRP above the second RSRP threshold among the plurality of SSBs is not available, determining to perform contention-based random access.

In accordance with another aspect of the disclosure, a method, performed by a base station, in a wireless communication system is provided. The method includes transmitting, to a terminal, a radio resource control (RRC) reconfiguration message including a reconfiguration with synchronization, receiving, from the terminal, a first message including a cell radio network temporary identity (C-RNTI) medium access control (MAC) control element (CE) based on the reconfiguration with synchronization, identifying whether the BS receives at least one of a physical random access channel (PRACH) or a physical uplink shared channel (PUSCH) via the first message, when the BS receives the PRACH and the PUSCH, transmitting, to the terminal, a third message including a first physical downlink control channel (PDCCH) and a physical downlink shared channel (PDSCH) including an absolute timing advance command MAC CE, when the BS receives the PRACH and does not receive the PUSCH, transmitting, to the terminal, a fallback random access response (RAR), and transmitting, to the terminal, a second PDCCH, the second PDCCH is received by the terminal configured with a discontinuous reception (DRX) during active time, and the active time includes a time while the second PDCCH indicating new transmission addressed to a C-RNTI corresponding to the C-RNTI MAC CE has not been received after determining by the terminal that the RAR reception is successful.

The reconfiguration with synchronization may include at least one of a terminal identity, timer information, or resource information for random access, and the resource information for random access may include at least one of first dedicated resource information for contention-free 4-step random access including first synchronization signal block (SSB) resource information, or second dedicated resource information for contention-free 2-step random access including second SSB resource information and resource information for the PUSCH of the first message.

The terminal may perform a 2-step random access procedure when the terminal receives, from the BS, both resource information for 4-step random access and resource information for 2-step random access and first reference signal received power (RSRP) of downlink pathloss reference signal is above a first RSRP threshold configured by the BS, the terminal receives, from the BS, the resource information for 2-step random access and does not receive the resource information for 4-step random access, or the reconfiguration with synchronization includes dedicated resource information for contention-free 2-step random access.

The reconfiguration with synchronization may include second dedicated resource information for contention-free 2-step random access including second SSB resource information associated with a plurality of SSBs, the terminal may perform contention-free random access when at least one SSB with a second RSRP above a second RSRP threshold among the plurality of SSBs is available, and the terminal may perform contention-based random access when the at least one SSB with the second RSRP above the second RSRP threshold among the plurality of SSBs is not available.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
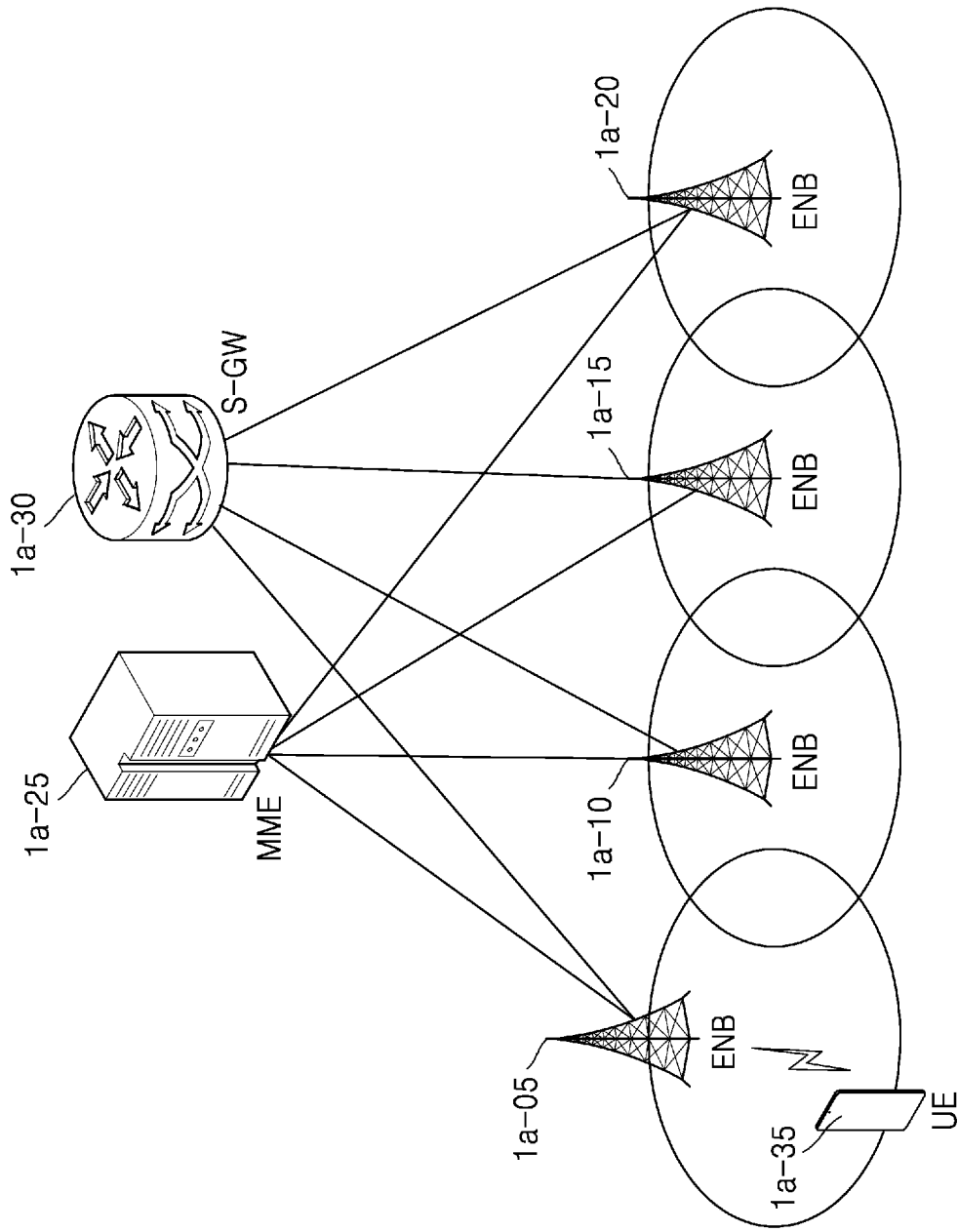
FIG. 1A is a diagram illustrating a structure of a long term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

As used herein, terms used to identify a connection node, terms referring to network entities, terms referring to messages, a term referring to interface between network entities, terms referring to various types of identification information, and the like are examples provided for convenience of explanation. Accordingly, the disclosure is not limited to the terms as herein used, and may use different terms to refer to objects having the same meaning in a technological sense.

Advantages and features of the disclosure, and methods for attaining them will be understood more clearly with reference to the following embodiments of the disclosure, which will be described in detail later along with the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Like numbers refer to like elements throughout the specification.

In this case, it will be understood that each block of process flowcharts and combinations of the flowcharts may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. These computer program instructions may also be stored in a computer-executable or computer readable memory capable of directing a computer or other programmable data processing equipment to implement the functions in a particular manner so that the instructions stored in the computer-executable or computer readable memory are also capable of producing manufacturing items containing instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to a software element or a hardware element, such as a field programmable gate array (FPGA) or an application-specific integrated circuit (ASIC), which performs certain functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes elements such as software elements, object-oriented software elements, class elements, and task elements, processes, functions, attributes, procedures, sub-routines, segments of program codes, drivers, firmware, microcodes, circuits, data, databases, data structures, tables, arrays, and variables. Functions provided in the elements and "portions", "modules" or "units" may be combined into a smaller number of elements and "portions", "modules" and "units", or sub-divided into additional elements and "portions", "modules" or "units". Also, the elements and "portions", "modules" or "units" may be configured to run on one or more central processing units (CPUs) in a device or a security multimedia card. In embodiments of the disclosure, the module may include one or more processors.

In the following description of the disclosure, when it is determined that detailed descriptions of related known functions or configurations may unnecessarily obscure the subject matter of the disclosure, the descriptions thereof will be omitted. Hereinafter, embodiments of the disclosure will be described with reference to accompanying drawings.

For convenience of description, the terms and names defined in the $3^{rd}$ generation partnership project long term evolution (3GPP LTE) standard are used herein. However, the disclosure is not limited by such terms and names, and may be equally applied to systems conforming to other standards.

Hereinafter, a base station refers to a subject that allocates a resource to a terminal, and may include at least one of a gNode B, an eNode, a node B, a base station (BS), a radio access unit, a BS controller, or a node in a network. Examples of a terminal may include a user equipment (UE), a mobile station (MS), a cellular phone, a smartphone, a computer, a multimedia system capable of performing a communication function and the like. However, the disclosure is not limited to the above examples.

Particularly, the disclosure may be applied to 3GPP new radio (NR) (5G mobile communication standards). Also, the disclosure is applicable to intelligent services (e.g., a smart home, a smart building, a smart city, a smart car or a connected car, health care, digital education, retail, security, and safety services) based on 5G communication technology and IoT technology. In the disclosure, an evolved Node B (eNB) will be used interchangeably with a next-generation Node B (gNB) for convenience of description. For example, a BS described as an eNB may represent a gNB. Also, the term "terminal" may indicate not only mobile phones, NB-IoT devices, and sensors, but also other wireless communication devices.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-A, LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication system, an LTE system uses orthogonal frequency division multiplexing (OFDM) in a DL and uses single carrier-frequency division multiple access (SC-FDMA) in an UL. The UL may refer to a radio link for transmitting data or a control signal from a terminal (e.g., a UE or a MS) to a base station (e.g., an eNB or a BS), and the downlink may refer to a radio link for transmitting data or a control signal from the base station to the terminal. The above-described multiple access schemes identify data or control information of different users in a manner that time-frequency resources for carrying the data or control information of the users are allocated and managed not to overlap each other, that is, to achieve orthogonality therebetween.

Future communication systems after LTE, that is, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (mMTC), and ultra reliability low latency communication (URLLC).

According to some embodiments of the disclosure, the eMBB is aimed at providing more enhanced data rates than the LTE, LTE-A or LTE-Pro may support. For example, in 5G communication systems, eMBB has to be able to provide a peak data rate of 20 Gbps in a downlink and a peak data rate of 10 Gbps in an uplink in terms of a single BS. Also, the 5G communication systems have to provide a peak data rate and simultaneously provide an increased user perceived data rate of the UE. In order to satisfy such requirements, there is a need to improve various transmission and reception technologies including an improved multi-input multi-output (MIMO) transmission technology. In addition, signals are transmitted by using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, mMTC is under consideration so as to support application services such as Internet of Thing (IoT) in 5G communication systems. In order to efficiently provide IoT, mMTC needs to support access of a massive UE in a cell, improve coverage of the UE, improve battery time, and reduce costs of the UE. Because IoT is attached to various sensors and various devices to provide a communication function, IoT has to be able to support a large number of UEs (e.g., 1,000,000 UEs/km$^2$) in a cell. Also, due to the nature of the service, a UE supporting mMTC is likely to be located in a shaded area that is not covered by the cell, such as the basement of a building. Therefore, wider coverage than other services provided by the 5G communication systems may be required. The UE supporting mMTC has to be configured as an inexpensive UE, and it is difficult to frequently replace a battery of the UE. Therefore, a very long battery life time such as 10 to 15 years may be required.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting URLLC may have to satisfy air interface latency of less than 05 milliseconds and simultaneously may require a packet error rate of $10^{-5}$ or less. Therefore, for the service supporting URLLC, the 5G systems have to provide a smaller transmit time interval (TTI) than other services and simultaneously require a design matter that has to allocate a wide resource in a frequency band so as to ensure reliability of a communication link.

The aforementioned three services considered in 5G communication systems, which are, eMBB, URLLC, and mMTC, may be multiplexed and transmitted in a single system. In this case, different transmission/reception techniques and transmission/reception parameters may be used between services in order to satisfy different requirements of the respective services. However, mMTC, URLLC, and eMBB are only examples of different service types, and the service types to which the disclosure is applied are not limited to the aforementioned examples.

For convenience of description below, the terms and names defined in LTE and NR standards, which are the latest standards defined by the 3GPP organizations among currently existing communication standards. However, the disclosure is not limited by such terms and names, and may be equally applied to systems conforming to other standards. Particularly, the disclosure may be applied to 3GPP NR (5G mobile communication standards). In addition, the embodiments of the disclosure may be applied to other communication systems having similar backgrounds or channel types. Also, embodiments of the disclosure may also be applied to other communication systems through some modifications without materially departing from the scope of the disclosure by the judgment of those of ordinary skill in the art.

When a 3GPP 5G NR technology is used, a method of operating discontinuous reception (DRX) when 2-step random access is used will be described at a later time.

Through the disclosure, when a terminal performs 2-step random access, the terminal may continuously receive data scheduling information even after a random access response is received, and thus a delay may be reduced.

FIG. 1A is a diagram illustrating a structure of an LTE system, according to an embodiment of the disclosure. An NR system may also have a similar structure.

Referring to FIG. 1A, a wireless communication system may include a plurality of ENBs 1a-05, 1a-10, 1a-15, and 1a-20, a mobility management entity (MME) 1a-20, and a serving-gateway (S-GW) 1a-30. A UE (or terminal) 1a-35 may access an external network through the ENB 1a-05, 1a-10, 1a-15, or 1a-20, and the S-GW 1a-30. However, the wireless communication system is not limited to examples of FIG. 1A, and may include more elements or fewer elements than the elements shown in FIG. 1A.

The ENBs 1a-05, 1a-10, 1a-15, and 1a-20 are access nodes of a cellular network and may provide wireless access to UEs accessing the network. That is, the ENB 1a-05, 1a-10, 1a-15, or 1a-20 collect state information, such as a buffer state, an available transmission power state, and a channel state, of UEs and perform scheduling to support connection between the UEs and a core network (CN) so as to service users' traffic. The MME 1a-25 may be an entity that performs various control functions as well as UE mobility management, and the S-GW 1a-30 may be an entity that provides a data bearer. Also, the MME 1a-25 and the S-GW 1a-30 may authenticate UEs accessing the network, perform bearer management, etc. and process packets received from or to be transmitted to the ENBs 1a-05, 1a-10, 1a-15, and 1a-20.

Figure 1B:
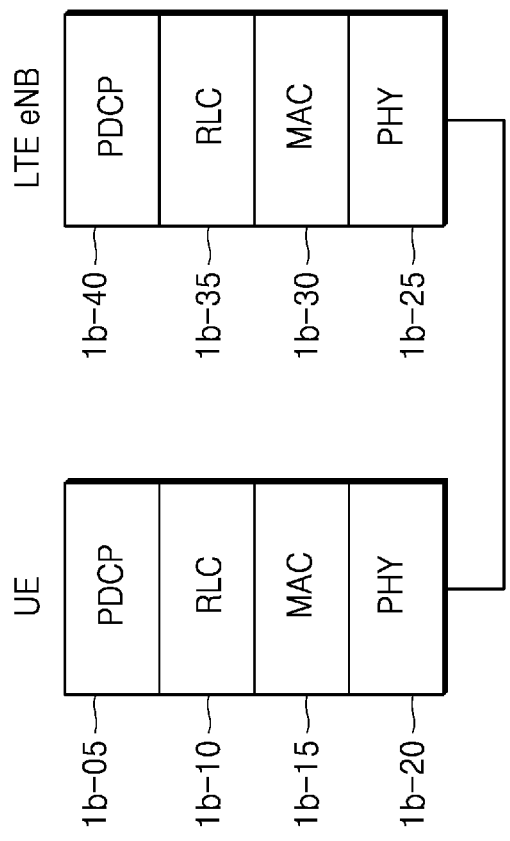
FIG. 1B is a diagram illustrating a radio protocol architecture of an LTE and new radio (NR) system, according to an embodiment of the disclosure.

FIG. 1B is a diagram illustrating a radio protocol architecture of an LTE and NR system, according to an embodiment of the disclosure.

Referring to FIG. 1B, the radio protocol architecture of the LTE system includes packet data convergence protocol (PDCP) layers 1b-05 and 1b-40, radio link control (RLC) layers 1b-10 and 1b-35, and medium access control (MAC) layers (or entities) 1b-15 and 1b-30, of a UE and an eNB/gNB.

The PDCP layer 1b-05 or 1b-40 may perform operations such as IP header compression/reconstruction, and the RLC layer 1b-10 or 1b-35 may reconstruct PPDU packet data units (PDUs) to appropriate sizes.

The MAC layer 1b-15 or 1b-30 may be connected to various RLC layers included in one UE, and may multiplex RLC PDUs into a MAC PDU and demultiplex RLC PDUs from a MAC PDU.

A physical layer 1b-20 or 1b-25 may channel-code and modulate upper layer data, generate OFDM symbols, and transmit the same through radio channels or may demodulate and channel-decode OFDM symbols received through radio channels and transmit the OFDM symbols to an upper layer. Also, the physical layer 1b-20 or 1b-25 may also use a hybrid automatic repeat request (HARQ) for additional error correction, and a receiving end may transmit information about whether a packet transmitted by a transmitting end is received, in 1 bit. This is called HARQ acknowledgement (ACK)/negative acknowledgement (NACK) information.

In the case of LTE, downlink HARQ ACK/NACK information about uplink data transmission may be transmitted through a physical hybrid-ARQ indicator channel (PHICH), and in the case of NR, may be provided based on scheduling information of the UE in a physical dedicated control channel (PDCCH) which is a channel on which downlink/uplink resource allocation and the like is transmitted. That is, in the NR, the eNB/gNB or the UE may determine whether retransmission of uplink data is required or new transmission through the PDCCH is required. This may be because an asynchronous HARQ is applied in the NR. Uplink HARQ ACK/NACK information about downlink data transmission may be transmitted through a physical channel such as a physical uplink control channel (PUCCH) or a physical uplink shared channel (PUSCH). The transmission through the PUCCH is generally performed in an uplink of a primary cell (PCell), to be described later, and when supported by the UE, the eNB/gNB may perform additional transmission to the UE in a secondary cell (SCell), to be described later, and this is called a PUCCH SCell.

Though not shown in the drawing, radio resource control (RRC) layers may be present above the PDCP layers 1b-05 and 1b-40 of the UE and the eNB/gNB, and the RRC layers may transmit or receive configuration control messages related to accessing and measurement for radio resource control. For example, the eNB/gNB may indicate, by using the messages of the RRC layers, the UE to perform measurement, and the UE may report a result of the measurement to the eNB/gNB by using the messages of the RRC layers.

Moreover, the physical layer 1b-20 or 1b-25 may be configured using one frequency/carrier or a plurality of frequencies/carriers, and a technology of simultaneously configuring and using a plurality of frequencies is referred to as carrier aggregation (CA). The CA is a technology that may significantly increase the transmission amount by the number of secondary carriers by using one primary carrier and one secondary carrier or a plurality of secondary carriers, instead of using only one carrier, for communication between a UE and an E-UTRAN Node B or eNB. In the LTE, a cell in an eNB/gNB which uses a primary carrier is referred to as a main cell or a PCell, and a cell in the eNB/gNB which uses a secondary carrier is referred to as a subcell or a SCell.

Figure 1C:
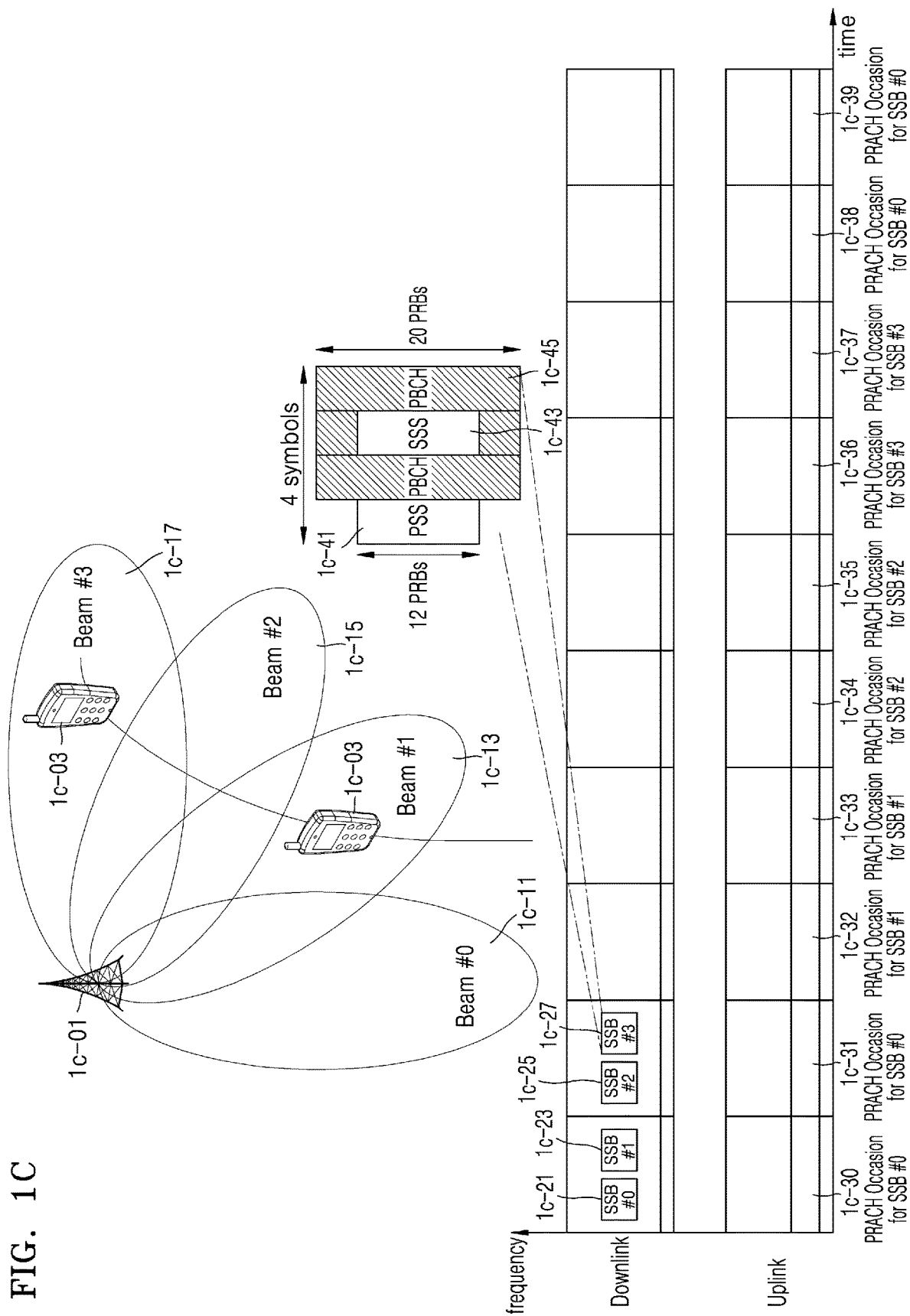
FIG. 1C is a diagram illustrating an example of structures of downlink and uplink channel frames during beam-based communication in an NR system, according to an embodiment of the disclosure.

FIG. 1C is a diagram illustrating an example of structures of downlink and uplink channel frames during beam-based communication in an NR system, according to an embodiment of the disclosure.

Referring to FIG. 1C, a BS 1c-01 may transmit signals in the form of beams 1c-11, 1c-13, 1c-15, and 1c-17 for a wider coverage or transmission of stronger signals. Accordingly, a UE 1c-03 in a cell may have to transmit and receive data by using a particular beam (e.g., beam #1 1c-13 in FIG. 1C) transmitted by the BS 1c-01.

Moreover, the state of the UE 1c-03 may be divided into a sleep mode (or idle mode) (RRC_IDLE) state and a connected mode (RRC_CONNECTED) state depending on whether the UE 1c-03 is connected to the BS 1c-01. Accordingly, a location of the UE 1c-03 in the sleep mode state may not be identified by the BS 1c-01.

When the UE 1c-03 in the sleep mode state attempts to transition to the connected mode state, the UE 1c-03 may receive synchronization signal blocks (SSBs) 1c-21, 1c-23, 1c-25, and 1c-27 transmitted by the BS 1c-01. The SSBs 1c-21, 1c-23, 1c-25, and 1c-27 are SSB signals periodically transmitted by the BS 1c-01 according to a set period, and the SSBs 1c-21, 1c-23, 1c-25, and 1c-27 may include a primary synchronization signal (PSS) 1c-41, a secondary synchronization signal (SSS) 1c-43, and a physical broadcast channel (PBCH).

In FIG. 1C, a scenario in which an SSB is transmitted for each beam is assumed. For example, a case where SSB #0 1c-21 is transmitted by using beam #0 1c-11, SSB #1 1c-23 is transmitted by using beam #1 1c-13, SSB #2 1c-25 is transmitted by using beam #2 1c-15, and SSB #3 1c-27 is transmitted by using beam #3 1c-17 is assumed. Also, in FIG. 1C, a case where the UE 1c-03 in the sleep mode state is located at beam #1 is assumed, but even when the UE 1c-03 in the connected mode state performs random access, the UE 1c-03 selects an SSB received at a time point when random access is performed.

Referring to FIG. 1C, the UE 1c-03 may receive SSB #1 1c-23 transmitted by using beam #1 1c-13. Upon reception of SSB #1 1c-23, the UE 1c-03 may obtain a physical cell identifier (PCI) of the BS 1c-01 through the PSS 1c-41 and the SSS 1c-43, and by receiving the PBCH, may identify not only an identifier (i.e., #1) of a currently received SSB and at which position in a 10 ms frame the current SSB is received, but may also identify at which system frame number (SFN) in an SFN having a period of 10.24 seconds is the current SSB. Also, a master information block (MIB) may be included in the PBCH, and the MIB may include information about which position system information block type 1 (SIB1) for broadcasting more detailed cell configuration information may be received. Upon reception of SIB1, the UE 1c-03 may identify a total number of SSBs transmitted by the BS 1c-01 and may identify a location of a physical random access channel (PRACH) occasion (in FIG. 1C, a scenario in which a PRACH occasion is allocated every 1 ms is assumed: from PRACH occasions 1c-30 to 1c-39) in which random access may be performed to transition to the connected mode state (more precisely, in which a preamble that is a physical signal specially designed for uplink synchronization may be transmitted). In addition, based on information of SIB1, the UE 1c-03 may determine which PRACH occasion among the PRACH occasions 1c-30 to 1c-39 is mapped to which SSB index. For example, in FIG. 1C, a scenario in which a PRACH occasion is allocated every 1 ms is assumed, and a scenario in which 1/2 SSB is allocated per PRACH occasion (i.e., 2 PRACH occasions per SSB) is assumed. Accordingly, a scenario in which 2 PRACH occasions are allocated for each SSB from the start of a PRACH occasion which starts according to an SFN value is illustrated. That is, the PRACH occasion 1c-30 and the PRACH occasion 1c-31 may be allocated for SSB #0 1c-21, and the PRACH occasion 1c-32 and the PRACH occasion 1c-33 may be allocated for SSB #1 1c-23. After PRACH occasions are configured for all SSBs, a PRACH occasion is allocated again for the first SSB (PRACH occasion 1c-38 and PRACH occasion 1c-39).

Accordingly, the UE 1c-03 may detect locations of PRACH occasions 1c-32 and 1c-33 for SSB #1 1c-21, and accordingly, may transmit a random access preamble in the earliest PRACH occasion (e.g., PRACH occasion 1c-32) at the current time point among the PRACH occasions 1-32 and 1c-33 corresponding to SSB #1 1c-21. Because the BS 1c-01 received the preamble in the PRACH occasion 1c-32, the BS 1c-01 may identify that the UE 1c-03 has transmitted the preamble by selecting SSB #1 1c-21, and accordingly, data may be transmitted and received through a beam corresponding to SSB #1 1c-21 when subsequent random access is performed.

Moreover, even when the UE 1c-03 in the connected mode state moves from a current (source) BS to a target BS for reasons such as handover, etc., the UE 1c-03 may perform random access at the target BS and may transmit random access by selecting an SSB. In addition, during handover, a handover command may be transmitted to the UE 1c-03 to move from the source BS to the target BS. In this case, in a handover command message, a dedicated random access preamble identifier for a corresponding UE may be allocated for each SSB of the target BS, to be used when random access is performed at the target BS. In this case, the BS 1c-01 may not allocate a dedicated random access preamble identifier for all beams (according to a current location of the UE 1c-03, etc.), and accordingly, a dedicated random access preamble may not be allocated to some of the SSBs (e.g., dedicated random access preambles are allocated only to beam #2 1c-15 and beam #3 1c-17).

When a dedicated random access preamble is not allocated to an SSB selected by the UE 1c-03 for preamble transmission, a contention-based random access preamble may be arbitrarily selected to perform random access. For example, in the drawing, a scenario in which the UE 1c-03 is initially positioned at beam #1 1c-11 and performs random access, but fails, and then, during retransmission of a random access preamble, is positioned at beam #3 1c-15 and transmits a dedicated preamble may be possible. That is, when preamble retransmission occurs even during one random access procedure, a contention-based random access procedure and a contention-free random access procedure may be mixedly used, according to whether a dedicated random access preamble is allocated to a selected SSB for each preamble transmission.

Figure 1D:
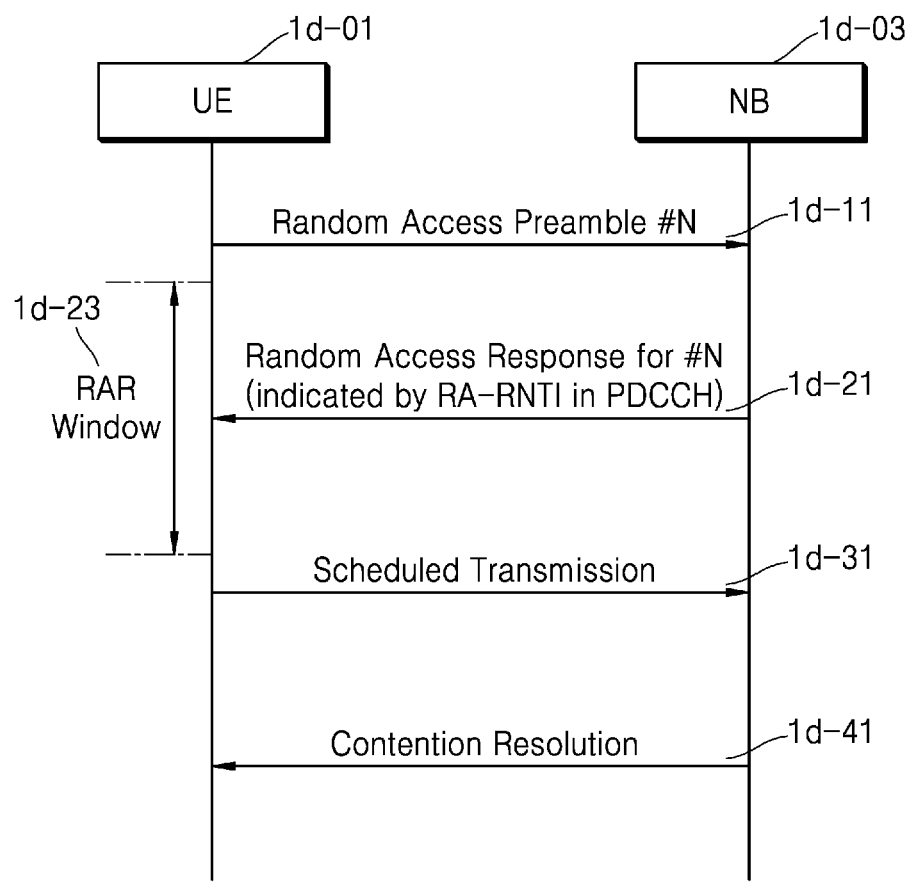
FIG. 1D is a diagram illustrating a procedure in which a terminal performs contention-based 4-step random access to a base station, according to an embodiment of the disclosure.

FIG. 1D is a diagram illustrating a procedure in which a UE performs contention-based 4-step random access to an NB, according to an embodiment of the disclosure.

Referring to FIG. 1D, it is a diagram illustrating a contention-based 4-step random access procedure performed by a UE 1d-01 to an NB 1d-03 in various cases requiring initial access, re-access, handover, and other random accesses.

In operation 1d-11, the UE 1d-01 may select a PRACH according to FIG. 1C described above and transmit a random access preamble to the PRACH, for access to the NB 1d-03. According to an embodiment of the disclosure, one or more UEs simultaneously transmit a random access preamble by using a PRACH resource. The PRACH resource may span one subframe, or only some symbols in one subframe may be used. Information about the PRACH resource may be included in system information broadcast by the NB 1d-03, and based on the Information about the PRACH resource, the UE 1d-01 may identify in which time and frequency resources a preamble has to be transmitted. Also, the random access preamble may include a plurality of preamble identifiers (indexes) according to a standard as a particular sequence specially designed to be receivable even when the random access preamble is transmitted before synchronization with the NB 1d-03 is completed. When there are a plurality of preamble identifiers, the preamble transmitted by the UE 1d-01 may be randomly selected by the UE 1d-01 or may be a particular preamble designated by the NB 1d-03.

In operation 1d-21, when the NB 1d-03 receives the preamble, the NB 1d-03 may transmit, to the UE 1d-01, a corresponding random access response (hereinafter, referred to as an RAR) message (this is also referred to as Msg2). The RAR message may include identifier information of the preamble used in operation 1d-11, uplink transmission timing correction information, uplink resource allocation information to be used in a subsequent operation (e.g., operation 1d-31), and temporary UE identifier information, etc. For example, when a plurality of UEs transmit different preambles to attempt random access in operation 1d-11, responses to each preamble may be included in the RAR message, and the identifier information of the preamble may be transmitted to indicate to which preamble the responses are response messages. Uplink resource allocation information included in each response to each preamble may be detailed information of a resource to be used by the UE 1d-01 in operation 1d-31 and may include a physical location and size of the resource, a modulation and coding scheme (MCS) used during transmission, power adjustment information during transmission, etc. When the UE 1d-01 having transmitted the preamble performs initial access, because the UE 1d-01 does not have an identifier allocated by the NB 1d-03 for communication with the NB 1d-03, the temporary UE identifier information may be a value transmitted for use in this case.

Moreover, the RAR message may include not only the response(s) to each preamble, but also, selectively, a backoff indicator (BI). When the random access preamble needs to be retransmitted because the random access is not successfully performed, the BI may be a value transmitted to cause a random delay in transmission according to a value of the BI without immediately retransmitting the preamble.

In more detail, when the UE 1d-01 does not properly receive the RAR or when contention, which will be described later, is not properly resolved, the UE 1d-01 may have to retransmit the random access preamble. In this case, the value indicated by the BI may be the following index value, and the UE 1d-01 may select a random value from among numbers from 0 to a value indicated by the index value and retransmit the random access preamble after an amount of time equivalent to the corresponding value has elapsed. For example, when the NB 1d-03 indicates 5 (i.e., 60 ms) as a BI value and the UE 1d-01 randomly selects a value of 23 ms from among numbers from 0 to 60, the selected value is stored in a variable called PREAMBLE_BACKOFF, and the UE 1d-01 performs a preamble retransmission procedure after a time of 23 ms. In a case where the BI is not transmitted, when the random access preamble needs to be retransmitted because the random access is not successfully performed, the UE 1d-01 may immediately transmit the random access preamble.

TABLE 1

| Index | Backoff Parameter value (ms) |
| --- | --- |
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |

TABLE 1-continued

| Index | Backoff Parameter value (ms) |
| --- | --- |
| 9 | 240 |
| 10 | 320 |
| 11 | 480 |
| 12 | 960 |
| 13 | 1920 |
| 14 | Reserved |
| 15 | Reserved |

The RAR message needs to be transmitted within a certain period of time starting from a certain time after the preamble is transmitted, and the certain period of time starting from the certain time after the preamble is transmitted is referred to as a "RAR window" 1d-23. The RAR window may be an interval starting from a point in time when a certain time elapses after a first preamble is transmitted. The certain time may have a subframe unit (1 ms) or a smaller value. Also, a length of the RAR window may be a certain value configured by the NB 1d-03 for each PRACH resource or for each set of at least one PRACH resource in a system information message broadcast by the NB 1d-03.

Moreover, when the RAR message is transmitted, the NB 1d-03 may schedule the RAR message through a PDCCH, and scheduling information of the RAR message may be scrambled by using a random access-radio network temporary identifier (RA-RNTI). The RA-RNTI is mapped to the PRACH resource used in transmission of the message in operation 1d-11, so that the UE 1d-01 having transmitted the preamble to a particular PRACH may determine whether there is a corresponding RAR message by attempting to receive the PDCCH based on the RA-RNTI. When the RAR message is a response to the preamble transmitted by the UE 1d-01 in operation 1d-11, as shown in the drawing, the RA-RNTI used in the scheduling information of the RAR message may include information about the transmission in operation 1d-11. For this purpose, the RA-RNTI may be calculated by the following equation, but is not limited to the following example.

$$RA\text{-}RNTI = 1 + s\_id + 14 \times t\_id + 14 \times 80 \times f\_id + 14 \times 80 \times 8 \times ul\_carrier\_id \quad \text{Equation 1}$$

In this case, s_id is an index corresponding to a first OFDM symbol in which transmission of the preamble transmitted in operation 1d-11 starts, and may have a value of $0 \leq s\_id < 14$ (i.e., the maximum number of OFDM symbols in one slot). Also, t_id may be an index corresponding to a first slot in which transmission of the preamble transmitted in operation 1d-11 starts, and may have a value of $0 \leq t\_id < 80$ (i.e., the maximum number of slots in one system frame (10 ms)). Also, f_id may indicate which ordinal number of a PRACH resource the preamble transmitted in operation 1d-11 is transmitted on frequency and may have a value of $0 \leq f\_id < 8$ (i.e., the maximum number of PRACHs on frequency in a same time). ul_carrier_id may be, when two carriers are used for an uplink for one cell, a parameter for identifying whether the preamble is transmitted in a normal uplink (NUL) (0 in this case) or whether the preamble is transmitted in a supplementary uplink (SUL) (1 in this case).

In operation 1d-31, the UE 1d-01 having received the RAR message may transmit another message over a resource allocated to the RAR message according various purposes described above. The message transmitted in operation 1d-31 in FIG. 1D is a third transmitted message and may also be referred to as Msg3 (i.e., the preamble in operation 1d-11 may be referred to as Msg1, and the RAR message in operation 1d-21 may be referred to as Msg2).

Examples of Msg3 transmitted by the UE 1d-01 may include an RRCSetupRequest message, which is a message of an RRC layer in the case of initial access, an RRCReestablishmentRequest message in the case of re-access, and an RRCReconfigurationComplete message during handover, but is not limited thereto. Alternatively, as Msg3, a buffer status report (BSR) message for resource request and the like may be transmitted.

Thereafter, for the case of initial transmission (i.e., when Msg3 does not include NB identifier information previously allocated to a UE, etc.), in operation 1d-41, the UE 1d-01 may receive a contention resolution message from the NB 1d-03, and the contention resolution message includes content transmitted by the UE 1d-01 through Msg3 as it is, so that even when there are a plurality of UEs having selected the same preamble in operation 1d-11, the NB 1d-03 may inform to which UE a response is provided.

Figure 1E:
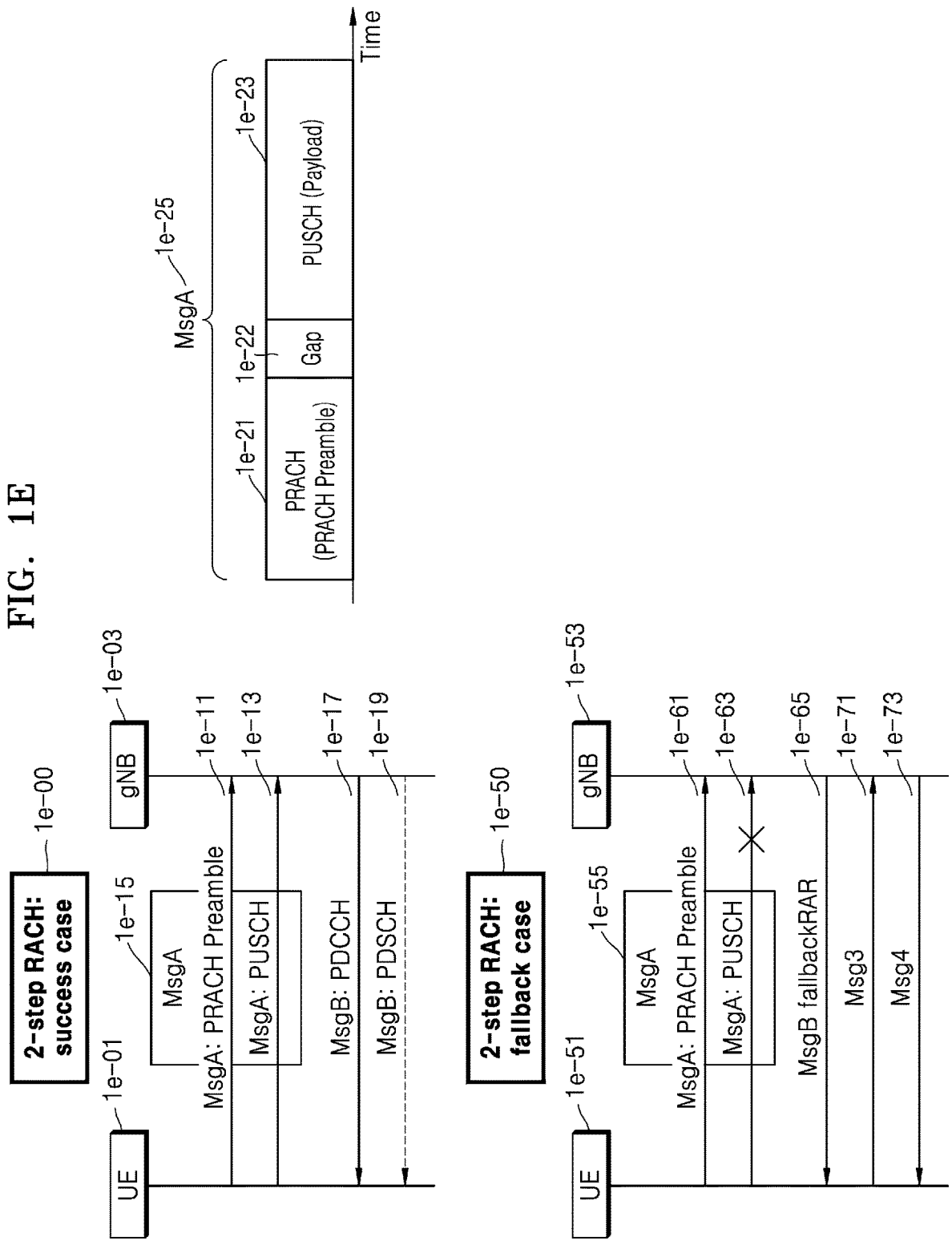
FIG. 1E is a diagram illustrating a procedure in which a terminal performs 2-step random access to a base station, according to an embodiment of the disclosure.

FIG. 1E is a diagram illustrating a procedure in which a UE performs 2-step random access to a BS, according to an embodiment of the disclosure.

When general contention-based random access is performed as described in FIG. 1D, at least 4 steps are performed, and when an error occurs in one step, the procedure may be further delayed. Accordingly, a scenario in which the random access procedure is reduced to a 2-step procedure.

Referring to FIG. 1E, for this purpose, in operation 1e-15, a UE 1e-01 transmits MsgA that consecutively transmits a preamble (Msg1 in the 4-step random access procedure) 1e-11 (which corresponds to operation 1d-11) and data (Msg3 in the 4-step random access procedure) 1e-13 (which corresponds to operation 1d-31) in the 4-step random access procedure, and then a gNB 1e-03 having received MsgA may transmit MsgB 1e-19 including information of Msg2 (RAR) (which corresponds to operation 1d-21) and Msg4 (which corresponds to operation 1d-41) in the 4-step random access procedure, so as to reduce the random access procedure. The procedure accordingly is described in (1e-00) in FIG. 1E.

In this case, when MsgA is illustrated according to time, MsgA may be that Msg1 and Msg3 are transmitted, respectively. For example, MsgA 1e-25 transmission may be performed by using a PRACH resource 1e-21 for transmitting Msg1, a PUSCH resource 1e-23 (used for data transmission) for transmitting Msg3, and a gap resource 1e-22 for resolving an interference problem that may occur during transmission by using the PUSCH resource 1e-23. Also, although only one PUSCH resource is illustrated in the drawing for convenience of description, a plurality of PUSCH resources may be actually configured, and which PUSCH resource to be used is mapped according to a preamble transmitted by the UE 1e-01, so that the gNB 1e-03 may identify which UE transmits a PUSCH based on the certain preamble (Msg1) transmitted by the UE.

Moreover, as described above in FIG. 1D, the UE 1e-01 may perform random access for various purposes. For example, the UE 1e-01 may perform random access to transmit a message for connection when the UE 1e-01 is not connected to the gNB 1e-03 or to transmit a message to restore connection when the UE 1e-01 is connected to the gNB 1e-03 but the connection is disconnected due to an error, and the aforementioned message may be a message included in a common control channel (CCCH). Control messages included in the CCCH may include RRCSetupRequest (during transition from an idle mode (RRC_IDLE) to a connected mode), RRCResumeRequest (during transition from an inactive mode (RRC_INACTIVE) to a connected mode), RRCReestablishmentRequest (when connection is restored), RRCSystemInfoRequest (when system information broadcast by a BS is requested), etc., but are not limited thereto. When the CCCH is included in MsgA because the UE 1e-01 has not established a connection with the gNB 1e-03, content included in MsgB may include uplink transmission timing information (timing advance command (TAC)) transmitted through Msg2 described above, a temporary cell-RNTI (C-RNTI), of the UE 1e-01, to be used by the UE 1e-01 in the gNB 1e-03 in the future, and contention resolution-related information (UE contention resolution identity) transmitted through Msg4, but is not limited thereto.

Moreover, when the UE 1e-01 normally accesses the gNB 1e-03, the UE 1e-01 may transmit and receive messages included in a dedicated control channel (DCCH) and a dedicated traffic channel (DTCH) in a connected mode (RRC_CONNECTED). In order for the UE 1e-01 to transmit data in an uplink, the UE 1e-01 needs to request uplink resource allocation by transmitting, to the gNB 1e-03, a BSR indicating the presence of data to be transmitted by the UE 1e-01 in the uplink. For this purpose, the gNB 1e-03 may allocate, to the UE 1e-01, a dedicated PUCCH resource for transmission of a scheduling request (SR) for a particular logical channel Through this, when the gNB 1e-03 receives the SR from the UE 1e-01 through the PUCCH, the gNB 1e-03 may allocate an uplink resource by which the BSR is to be transmitted, and when the UE 1e-01 transmits the BSR by using the uplink resource, the gNB 1e-03 may identify a buffer state of the UE 1e-01 and allocate an uplink resource for data.

Moreover, when the gNB 1e-03 did not allocate the SR for the particular logical channel (a logical concept identified according to the type of data such as control data and general data) or when the gNB 1e-03 allocated the SR but failed to transmit the BSR because the uplink resource was not received even though the SR has been transmitted as many times as the maximum number of SR transmissions, the UE 1e-01 may perform random access and transmit the BSR included in Msg3 or MsgA.

Accordingly, after the UE 1e-01 accesses the gNB 1e-03, when each logical channel is configured for transmission of data included in the DCCH and the DTCH for a logical channel and random access is performed for transmission for the logical channel, the UE 1e-01 may inform that a subject performing the random access is the UE 1e-01 itself by transmitting a C-RNTI MAC control element (CE) including UE identifier information through MsgA.

The gNB 1e-03 having received both Msg1 and Msg3 included in MsgA may transmit MsgB to the UE 1e-01 (1e-17 and 1e-19). MsgB may be composed of a PDCCH 1e-17 alone, or a combination of a PDCCH 1e-17 and a PDSCH (i.e., msgB 1e-19) transmitted by using a resource indicated by the PDCCH 1e-17, according to the type of packet transmitted by the UE 1e-01 through MsgA. In more detail, it may be as follows.

When the UE 1e-01 transmits a message corresponding to a CCCH to transition from an RRC_IDLE or RRC_INACTIVE state to an RRC_CONNECTED state, for a time period of msgB-ResponseWindow after MsgA transmission, a PDCCH 1e-17 including an MSGB-RNTI corresponding to a timing at which the UE 1e-01 transmits MsgA may be monitored, and random access may be completed according to an RAR corresponding to a response to a preamble transmitted by the UE 1e-01 among one or a plurality of RARs included in an additionally indicated PDSCH (i.e., MSG 1e-19). In this case, two RARs may exist in the RAR, successRAR to be transmitted when the gNB 1e-03 successfully receives both the PRACH resource 1e-21 and the PUSCH resource 1e-23 of MsgA, and fallbackRAR to be transmitted when the gNB 1e-03 successfully receives only the PRACH resource 1e-21 of MsgA. In the case of successRAR, the RAR may be an RAR including all information included in Msg2 and Msg4, excluding preamble information in the existing 4-step random access (this is because contention resolution information included in Msg4 may be used to specify which UE the response is for), and in the case of fallbackRAR, the RAR may be an RAR including information included in Msg2, including preamble information in the existing 4-step random access, and the random access step may be switched to 4 steps as in the 4-step random access. This will be described in detail at a later time.

Moreover, when the UE 1e-01 performs random access in the RRC_CONNECTED state, the UE 1e-01 may include, and transmit, a C-RNTI MAC CE including a C-RNTI, which is a UE identifier used by the UE 1e-01 in the RRC_CONNECTED state, in the PUSCH 1e-23 of MsgA. In this case, as in the aforementioned example, the gNB 1e-03 may well receive both the PRACH resource 1e-21 and the PUSCH resource 1e-23 or may well receive only the PRACH resource 1e-21. When only the PRACH resource 1e-21 is transmitted, the UE 1e-01 may receive fallbackRAR as in the aforementioned example, and may include, in Msg3, the PUSCH resource 1e-23 transmitted through MsgA and transmit the same again to the gNB 1e-03. However, when the gNB 1e-03 successfully receives both the PRACH resource 1e-21 and the PUSCH resource 1e-23 of MsgA, the PDCCH 1e-17 itself including the C-RNTI of the UE 1e-01 may be MsgB based on conditions. In more detail, in a case where the UE 1e-01 performs random access for beam failure recovery, the PDCCH 1e-17 itself including the C-RNTI may be MsgB (regardless of an uplink/downlink resource), and upon reception of the PDCCH 1e-17, the UE 1e-01 may determine that RAR reception has been successful and determine that the random access procedure has been successfully completed. Also, in a case where the UE 1e-01 does not perform random access for beam failure recovery, when an uplink of a PCell is in synchronization (i.e., when timeAlignmentTimer related to a timing advance group of a PCell or a PSCell performing random access is running), upon reception of a PDCCH 1e-17 including a C-RNTI indicating uplink resource allocation, the UE 1e-01 may determine that RAR reception has been successful and determine that the random access procedure has been successfully completed. However, in the case where the UE 1e-01 does not perform random access for beam failure recovery, when the uplink of the PCell is not in synchronization, the UE 1e-01 may receive the PDCCH 1e-17 including the C-RNTI indicating uplink resource allocation, and when a transmitted absolute timing advance command MAC CE including absolute time adjustment information for uplink synchronization with a corresponding downlink resource (PDSCH) is received, the UE 1e-01 may determine that RAR reception has been successful and determine that the random access procedure has been successfully completed.

As described above, when a collision occurs due to transmission of several pieces of MsgA in operation 1e-55, the gNB 1e-03 may receive only (pieces of) Msg1 included in MsgA and may not receive Msg3 1e-71 and Msg4 1e-73. In this case, the gNB 1e-03 may transmit MsgB 1e-65 to the UE 1e-01 instead of MsgB 1e-19 described above and switch to the 4-step random access procedure described in FIG. 1D, so as to perform the remaining random access procedure. This is described in (1e-50) of FIG. 1E, and as such, a mode in which the 2-step random access 1e-50 is switched to the 4-step random access is referred to as a fallback mode.

Moreover, there may be a case where a UE 1e-51 performs random access while moving from a current BS (source BS) to another BS (target BS). In this case, the source BS may request the target BS for handover of the UE 1e-51 (i.e., transmit a HandoverPreparationInformation message), receive a handover command (HandoverCommand message) including an RRCReconfiguration message of an RRC layer from the target BS, and transmit the received RRCReconfiguration message again to the UE 1e-51, so as to command the UE 1e-51 to move to the target BS. The RRCReconfiguration message is generated by the target BS and transmitted to the source BS, and the RRCReconfiguration may include information to which a dedicated random access resource is allocated so that random access may be performed on a contention-free basis when random access to the target BS is performed. In this case, a preamble may be allocated (for each SSB) for contention-free 4-step random access. Alternatively, a gNB 1e-53 may allocate a dedicated PRACH resource 1e-61 and PUSCH resource 1e-63 to the UE 1e-51 for contention-free 2-step random access.

When the UE 1e-51 is allocated the dedicated PRACH resource 1e-61 and PUSCH resource 1e-63 for contention-free 2-step random access, the UE 1e-51 may transmit MsgA to the gNB 1e-53 by using the allocated resources. However, even when a dedicated resource is used, the gNB 1e-53 may receive both the PRACH 1e-61 and the PUSCH resource 1e-63, or may receive only the PRACH for reasons such as a channel state and the like.

In a case where the gNB 1e-53 receives both the PRACH 1e-61 and the PUSCH resource 1e-63, because an uplink in the target BS is not yet synchronized as in one of the above-described cases where the UE 1e-01 performs random access in the RRC_CONNECTED state, the UE 1e-51 may receive a PDCCH including a C-RNTI indicating downlink resource allocation, and when a transmitted absolute timing advance command MAC CE including absolute time adjustment information for uplink synchronization with a corresponding downlink resource (PDSCH) is received, the UE 1e-51 may determine that RAR reception has been successful and determine that the random access procedure has been successfully completed.

When the gNB 1e-53 has successfully received only the PRACH 1e-61, because the PRACH resource 1e-61 is a resource allocated exclusively to a corresponding UE, the target BS may identify which UE has performed random access based on the preamble. Accordingly, in this case, the UE 1e-51 receives fallbackRAR, but may determine that the random access procedure has been successfully completed even though only fallbackRAR is received. Also, the UE 1e-51 may transmit PUSCH data through Msg3 by using a resource received as fallbackRAR, the PUSCH data having been previously transmitted through MsgA.

Figure 1F:
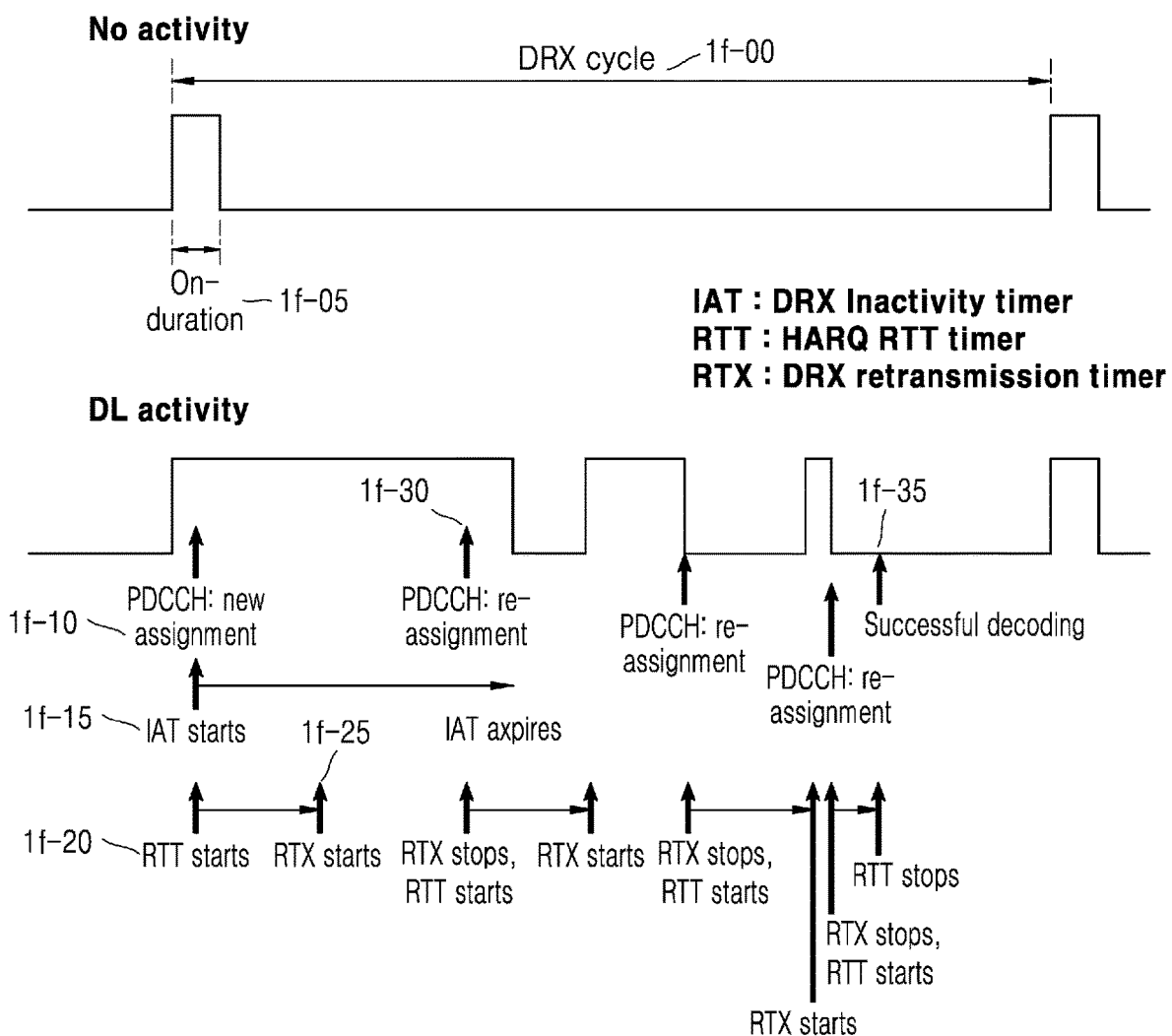
FIG. 1F is a diagram for describing a discontinuous reception (hereinafter, referred to as DRX) operation configured for a terminal in order to reduce power consumption of the terminal, according to an embodiment of the disclosure.

FIG. 1F is a diagram for describing a DRX operation configured for a UE in order to reduce power consumption of the UE, according to an embodiment of the disclosure.

Referring to FIG. 1F, DRX refers to a technology of monitoring only some PDCCHs in time according to configuration information, instead of monitoring all PDCCHs, in order to obtain scheduling information, according to configurations of a BS to minimize power consumption of a UE. The DRX may be configured by a drx-Config field in an RRCReconfiguration message of an RRC layer. In the drx-Config, lengths of various timers required for the DRX operation to be described at a later time may be configured. Also, an active time and a non-active time may be present in the DRX, and the UE may monitor a PDCCH present during the active time. A case when any one of the following conditions is satisfied may be referred to as the active time.

First condition: When at least one of drx-onDuration-Timer, drx-InactivityTimer, drx-RetransmissionTimerDL, drx-RetransmissionTimerUL, or ra-ContentionResolution-Timer, which will be described at a later time, is running;

Second condition: When a scheduling request is transmitted through a PUCCH for uplink data transmission and the request is still pending; or Third condition: When a UE receives an RAR after performing contention-free random access, and does not receive a PDCCH including a C-RNTI indicating new data transmission. (i.e., in the case of 4-step random access, only contention-free random access is included, and in the case of contention-based random access, the UE may monitor the PDCCH in the active time according to ra-ContentionResolutionTimer that (re)starts after Msg3 transmission)

Among the above conditions, the first condition related to a DRX timer will be mainly described in the drawing. A basic DRX operation has a DRX cycle 1f-00, and the PDCCH may be monitored only for a time period of drx-onDurationTimer 1f-05 at the start of the DRX cycle 1f-00. Accordingly, in the RRC layer, a DRX cycle 1f-00, at which the drx-onDurationTimer 1f-05 starts, and a time offset may be configured for the UE. Also, the DRX cycle 1f-00 may be configured in two types, long DRX and short DRX, and a long DRX cycle is always configured when DRX is configured, but the BS may additionally configure a short DRX cycle, as necessary. When both the long DRX cycle and the short DRX cycle are configured, the UE starts drx-ShortCycleTimer and repeats from the short DRX cycle, and when there is no new traffic until after the drx-ShortCycleTimer expires, the UE may switch the DRX cycle 1f-00 from the short DRX cycle to the long DRX cycle. That is, when data is generated once, the possibility of future data generation is high, and thus the short DRX is used to check whether there is additional data in a short cycle, and when no additional data is generated during the drx-ShortCycleTimer, the short DRX is switched to the long DRX.

When scheduling information for a new (downlink in the drawing) packet is received through the PDCCH for the time period of drx-onDurationTimer 1f-05 (1f-10), the UE may start drx-InactivityTimer (1f-15). Accordingly, the UE may maintain the active time during the drx-InactivityTimer according to the aforementioned first condition. That is, the UE may continue to perform PDCCH monitoring. Also, while the UE is in the active time, after corresponding downlink data is received, the UE may transmit HARQ feedback information through the PUCCH, and then start drx-HARQ-RTT-TimerDL (1f-20). The HARQ feedback information may indicate either 'well received' (ACK) or 'not received' (NACK), and in the drawing, a scenario in which data reception fails and NACK is transmitted is assumed. The drx-HARQ-RTT-TimerDL may be applied to prevent the UE from unnecessarily monitoring the PDCCH for a HARQ round trip time (RTT) period, and the timer operation has an effect of causing a delay in the timing of monitoring the PDCCH for future retransmissions. Accordingly, the UE may further reduce power consumption. Thereafter, when the drx-HARQ-RTT-TimerDL expires, in a case where corresponding data reception fails as in the aforementioned example, drx-RetransmissionTimerDL may start (1f-25). In contrast, in a case where data reception is successful, after the drx-HARQ-RTT-TimerDL expires, the drx-RetransmissionTimerDL may not start. According to the aforementioned first condition, when the UE starts the drx-RetransmissionTimerDL, the UE may have to perform PDCCH monitoring while the drx-RetransmissionTimerDL is running. Accordingly, the UE may receive scheduling information for HARQ retransmission during an operating time of the drx-RetransmissionTimerDL (1f-30). Upon reception of the scheduling information, the UE may immediately stop the drx-RetransmissionTimerDL, receive data and then transmit HARQ feedback, and restart the drx-HARQ-RTT-TimerDL. The above operation may continue until the packet is successfully received (1f-35).

Also, when the BS has no more data to transmit to the UE while the drx-onDurationTimer or the drx-InactivityTimer is running, the BS may transmit a DRX command MAC CE message to the UE. The UE having received the DRX command MAC CE message stops both the drx-onDurationTimer and the drx-InactivityTimer, and when the short DRX is configured, the short DRX cycle may be used first, and when only the long DRX is configured, the long DRX cycle may be used.

Figure 1G:
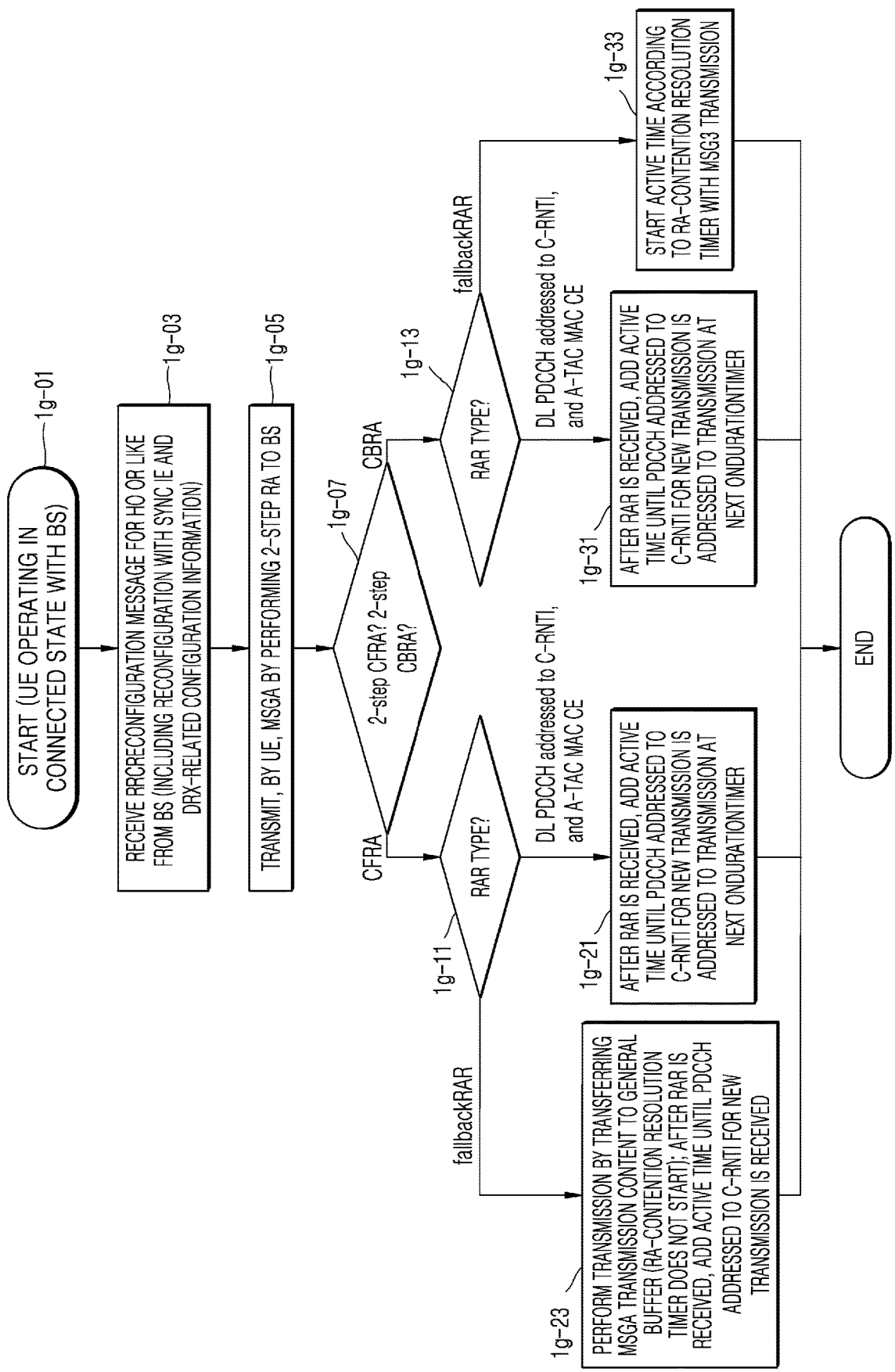
FIG. 1G is a diagram illustrating an operation sequence of a terminal operating DRX when the terminal performs a 2-step random access procedure during handover, according to an embodiment of the disclosure.

FIG. 1G is a diagram illustrating an operation sequence of a UE operating DRX when the UE performs a 2-step random access procedure during handover, according to an embodiment of the disclosure.

Referring to FIG. 1G, it is assumed that the UE accesses a BS and is in an RRC connected state. The UE in the RRC connected state may perform data transmission and reception with the BS (operation 1g-01).

Then, the UE may receive, from the BS, a handover command to move to another BS (operation 1g-03). The handover command may indicate a case in which a reconfigurationWithSync field is included in an RRCReconfiguration message of an RRC layer. The reconfigurationWithSync field may include UE identifier information to be used by a target BS and length information of a timer T304 used to detect a handover failure, and when the UE receives the RRCReconfiguration message for handover, the UE may start the timer T304. Also, the UE may receive, from the BS, a DRX-related configuration (configured by a drx-Config field in the field) to be used by the target BS in the RRCReconfiguration message. In addition, the UE may be selectively allocated, through the RRCReconfiguration message, a dedicated resource that is available during the random access procedure when the UE accesses the target BS for a handover procedure. The dedicated resource may include one of a dedicated resource for 4-step random access (i.e., a preamble for each SSB) or a dedicated resource for 2-step random access (i.e., a preamble for each SSB and a PUSCH resource for MsgA).

When the UE is configured with the dedicated resource for 4-step random access, the UE may perform a contention-free 4-step random access procedure. However, when the UE is configured with the dedicated resource for 2-step random access or when the strength of a downlink signal is greater than a threshold (msgA-RSRP-Threshold) received from the BS in a state in which both contention-based 2-step and 4-step random access procedures are possible, the UE may perform the aforedescribed 2-step random access procedure.

Accordingly, in the drawing, a scenario in which the UE determines to perform the 2-step random access procedure and transmits MsgA is assumed (operation 1g-05). Because the UE is in a connected state regardless of whether random access is contention-based random access (CBRA) or contention-free random access (CFRA), a C-RNTI MAC CE message including a C-RNTI allocated to the UE by a target BS may be included in MsgA and be transmitted. The reason why the C-RNTI MAC CE message is included even in the case of contention-free random access is to prevent the complexity of regenerating a message when switching from a contention-free basis to a contention basis during the random access. Moreover, when the UE does not receive the dedicated resource for 2-step random access, the UE performs contention-based 2-step random access, but even when the UE receives the dedicated resource for 2-step random access, and the strength of a received signal of an SSB for which the dedicated resource is allocated is less than another threshold (msgA-RSRP-ThresholdSSB) received from the BS, the UE may perform contention-based 2-step random access.

Accordingly, even after the UE determines to perform the 2-step random access procedure, the UE may determine whether to perform contention-based or contention-free 2-step random access (operation 1g-07). Moreover, the UE may perform the aforedescribed DRX operation from a time point when an SFN of a PCell of the target BS performing handover is obtained. Accordingly, as an embodiment of the DRX operation after random access, when the UE performs 2-step random access, regardless of whether the random access is on a contention or contention-free basis, the UE always determines that the random access has been successfully received, and then may always operate in the active time until a PDCCH including a C-RNTI indicating new transmission is received, so as to monitor the PDCCH. This has a disadvantage in that the UE unnecessarily monitors the PDCCH in terms of UE operation, but has an advantage of simplifying implementation.

As another embodiment, the UE may operate the active time in the DRX operation differently according to the type of 2-step random access and the type of response.

For example, when the UE determines to perform the contention-free 2-step random access (operation 1g-07), as described above (when the BS receives both a PRACH and a PUSCH), the UE may receive a PDCCH including a C-RNTI indicating downlink resource allocation and may receive a transmitted absolute timing advance command MAC CE including absolute time adjustment information for uplink synchronization with a corresponding downlink resource (PDSCH), or (when the BS receives only the PRACH), the UE may receive fallbackRAR (operation 1g-11).

When the UE receives the PDCCH including the C-RNTI indicating downlink resource allocation and receives the transmitted absolute timing advance command MAC CE including absolute time adjustment information for uplink synchronization with the corresponding downlink resource (PDSCH), in a case where the UE is not continuously in the active time, a delay may occur by waiting for a next active time (i.e., until drx-onDurationTimer starts). For this purpose, after the RAR is received, the UE may continue to monitor the PDCCH by determining a corresponding period as the active time until a PDCCH addressed to C-RNTI for new transmission is received (operation 1g-21). Alternatively, even at the risk of a delay, in order to reduce the influence on implementation, the UE may select a method of waiting until next drx-onDurationTimer starts without adding a separate active time.

However, when the UE performs the contention-free 2-step random access and receives fallbackRAR, the UE may determine that the random access has been successfully completed as described above. However, a fallbackRAR message may include resource information for uplink transmission (such as an Msg2 (RAR) message in 4-step random access). Accordingly, the UE does not transfer data, which was transmitted through previous MsgA by using the PUSCH, to an Msg3 buffer used in the contention-based random access, but may perform transmission by transferring the data to a buffer having an HARQ process identifier 0. In this case, ra-ContentionResolutionTimer which is to start during Msg3 transmission may not start. Alternatively, the UE transfers the data, which was transmitted through previous MsgA by using the PUSCH, to the Msg3 buffer used in the contention-based random access and transmits Msg3, but determines that the random access procedure has already been successfully completed, and thus a case in which ra-ContentionResolutionTimer related to random access does not start may also be considered. Accordingly, because the ra-ContentionResolutionTimer does not start in both of the aforedescribed examples, when the UE is not continuously in the active time, a delay may occur by waiting for the next active time (i.e., until the drx-onDurationTimer starts). For this purpose, after the RAR is received, the UE may continue to monitor the PDCCH by determining a corresponding period as the active time until the PDCCH addressed to C-RNTI for new transmission is received (operation 1g-23).

Moreover, even when the UE determines to perform the contention-free 2-step random access according to the aforedescribed procedure (operation 1g-07), as described above (when the BS receives both the PRACH and the PUSCH), the UE may receive the PDCCH including the C-RNTI indicating downlink resource allocation and may receive the transmitted absolute timing advance command MAC CE including absolute time adjustment information for uplink synchronization with the corresponding downlink resource (PDSCH), or (when the BS receives only the PRACH), the UE may receive fallbackRAR (operation 1g-13).

When the UE receives the PDCCH including the C-RNTI indicating downlink resource allocation and receives the transmitted absolute timing advance command MAC CE including absolute time adjustment information for uplink synchronization with the corresponding downlink resource (PDSCH), in a case where the UE is not continuously in the active time, a delay may occur by waiting for the next active time (i.e., until the drx-onDurationTimer starts). For this purpose, after the RAR is received, the UE may continue to monitor the PDCCH by determining a corresponding period as the active time until the PDCCH addressed to C-RNTI for new transmission is received (operation 1g-31). Alternatively, even at the risk of a delay, in order to reduce the influence on implementation, the UE may wait until next drx-onDurationTimer starts without adding a separate active time.

However, when the UE receives fallbackRAR while performing the contention-based 2-step random access, the UE may perform contention-based Msg3 transmission from a resource received as fallbackRAR by transferring the data, which was transmitted through previous MsgA by using the PUSCH, to the Msg3 buffer (operation 1g-33). Accordingly, the UE starts the ra-ContentionResolutionTimer, so that the UE may monitor the PDCCH while the ra-ContentionResolutionTimer is running without adding a separate active time.

Through the aforedescribed procedure, when the 2-step random access is performed, the UE may consecutively receive data scheduling information even after a random access response is received, thereby reducing a delay for new transmission and retransmission.

Figure 1H:
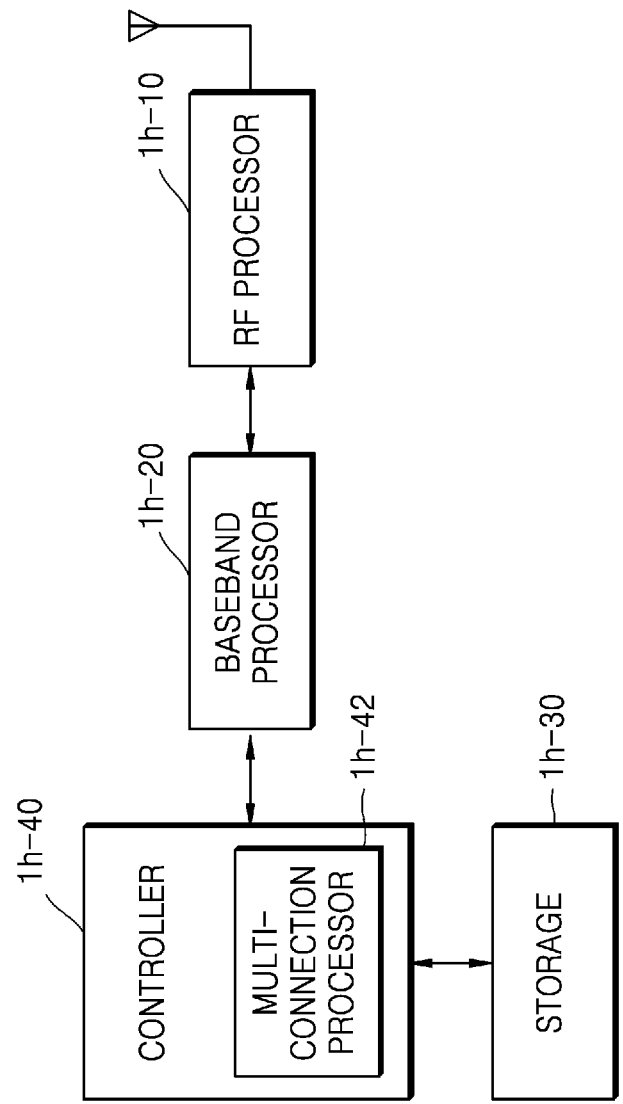
FIG. 1H illustrates a block configuration of a terminal in a wireless communication system, according to an embodiment of the disclosure.

FIG. 1H illustrates a block configuration of a UE in a wireless communication system, according to an embodiment of the disclosure.

Referring to FIG. 1H, the UE may include an RF processor 1h-10, a baseband processor 1h-20, a storage 1h-30, and a controller 1h-40. However, the elements of the UE are not limited to elements shown in FIG. 1H, and may be implemented with more elements than the elements shown in FIG. 1H.

The RF processor 1h-10 performs functions, such as signal-band conversion, amplification, etc., to transmit and receive signals on a radio channel. That is, the RF processor 1h-10 may up-convert a baseband signal provided from the baseband processor 1h-20 into an RF band signal and transmit the same through an antenna and may down-convert an RF band signal received through the antenna into a baseband signal. For example, the RF processor 1h-10 may include a transmission filter, a reception filter, an amplifier, a mixer, an oscillator, a digital-to-analog converter (DAC), and an analog-to-digital converter (ADC). Although only one antenna is illustrated in FIG. 1H, the UE may include a plurality of antennas. Also, the RF processor 1h-10 may include a plurality of RF chains. In addition, the RF processor 1h-10 may perform beamforming. For beamforming, the RF processor 1h-10 may adjust the phases and magnitudes of signals transmitted and received through a plurality of antennas or antenna elements.

The baseband processor 1h-20 may perform a conversion function between a baseband signal and a bit string according to a physical layer standard of a system. For example, during data transmission, the baseband processor 1h-20 may generate complex symbols by encoding and modulating a transmit bit string. Also, during data reception, the baseband processor 1h-20 may reconstruct a received bit string by demodulating and decoding the baseband signal provided from the RF processor 1h-10. For example, according to an OFDM scheme, during data transmission, the baseband processor 1h-20 may generate complex symbols by encoding and modulating a transmit bit string, map the complex symbols to subcarriers, and then configure OFDM symbols through an inverse fast Fourier transform (IFFT) operation and cyclic prefix (CP) insertion. Also, during data reception, the baseband processor 1h-20 may segment the baseband signal provided from the RF processor 1h-10 in units of OFDM symbols, reconstruct signals mapped to the subcarriers through a fast Fourier transform (FFT) operation, and then reconstruct a received bit string through demodulation and decoding.

The baseband processor 1h-20 and the RF processor 1h-10 transmit and receive signals as described above. Accordingly, the baseband processor 1h-20 and the RF processor 1h-10 may be referred to as a transmitter, a receiver, a transceiver, or a communicator. Furthermore, at least one of the baseband processor 1h-20 or the RF processor 1h-10 may include a plurality of communication modules so as to support a plurality of different radio access technologies. Also, at least one of the baseband processor 1h-20 or the RF processor 1h-10 may include a plurality of communication modules to process signals of different frequency bands. For example, the different radio access technologies may include wireless LAN (For example, IEEE 802.11), a cellular network (for example, LTE), and the like. Also, the different frequency bands may include a super high frequency (SHF) (e.g., 2.5 GHz or 5 Ghz) band and a millimeter wave (mmWave) (e.g., 60 GHz) band. The UE may transmit and receive signals to and from a BS by using the baseband processor 1h-20 and the RF processor 1h-10, and the signals may include control information and data.

The storage 1h-30 may store data such as a basic program, an application program, or configuration information for operation of the UE. In particular, the storage 1h-30 may store information related to a wireless LAN node that performs wireless communication using a wireless LAN access technology. The storage 1h-30 may provide stored data in response to a request from the controller 1h-40. The storage 1h-30 may include a storage medium such as a ROM, a RAM, a hard disk, a CD-ROM, and a DVD, or a combination of storage mediums. Also, the storage 1h-30 may include a plurality of memories. According to an embodiment of the disclosure, the storage 1h-30 may store a program for a method in which a UE according to the disclosure applies MAC configuration information.

The controller 1h-40 controls overall operations of the UE. For example, the controller 1h-40 may transmit and receive signals through the baseband processor 1h-20 and the RF processor 1h-10. Also, the controller 1h-40 may write and read data to and from the storage 1h-30. For this purpose, the controller 1h-40 may include at least one processor. For example, the controller 1h-40 may include a communication processor (CP) for performing control for communication and an application processor (AP) for controlling an upper layer such as an application program. At least one component in the UE may be implemented in a single chip. Also, according to an embodiment of the disclosure, the controller 1h-40 may include a multi-connection processor 1h-42 that performs a process for operation in a multi-connection mode. For example, the controller 1h-40 may control the UE to perform the procedure shown in the above-described UE operation.

Figure 1I:
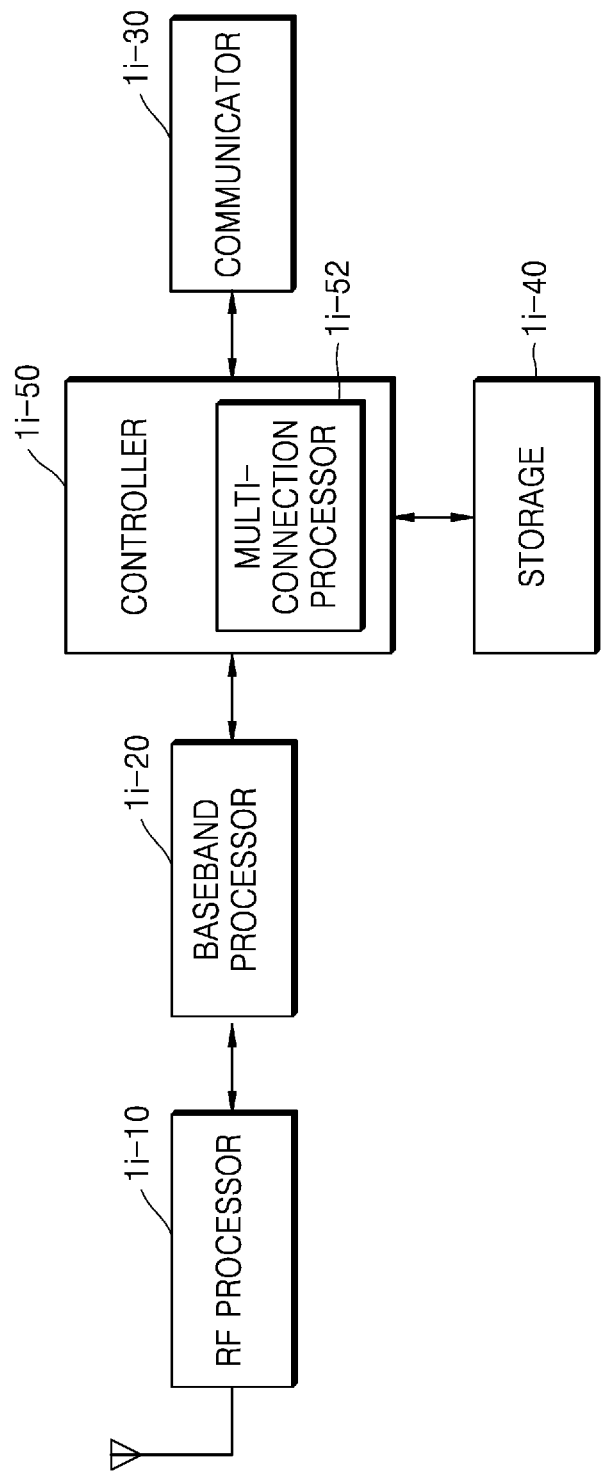
FIG. 1I illustrates a block configuration of a base station in a wireless communication system, according to an embodiment of the disclosure.

FIG. 1I illustrates a block configuration of a BS in a wireless communication system, according to an embodiment of the disclosure.

Referring to FIG. 1I, the BS may include an RF processor 1i-10, a baseband processor 1i-20, a communicator 1i-30, a storage 1i-40, and a controller 1i-50. However, the elements of the BS are not limited to elements shown in FIG. 1I, and may be implemented with more elements than the elements shown in FIG. H.

The RF processor 1i-10 may perform functions, such as band-band conversion, amplification, etc., to transmit or receive signals through a radio channel. The RF processor 1i-10 may up-convert a baseband signal provided from the baseband processor 1i-20 into an RF band signal and transmit the same through an antenna and may down-convert an RF band signal received through the antenna into a baseband signal. For example, the RF processor 1i-10 may include a transmission filter, a reception filter, an amplifier, a mixer, an oscillator, a DAC, and an ADC. Although only one antenna is illustrated in FIG. 1I, the RF processor 1i-10 may include a plurality of antennas. Also, the RF processor 1i-10 may include a plurality of RF chains. Also, the RF processor 1i-10 may perform beamforming. For beamforming, the RF processor 1i-10 may adjust the phases and magnitudes of signals transmitted and received through a plurality of antennas or antenna elements. The RF processor 1i-10 may perform a DL MIMO operation by transmitting one or more layers.

The baseband processor 1i-20 may perform a conversion function between a baseband signal and a bit string according to a physical layer standard of a certain radio access technology. For example, during data transmission, the baseband processor 1i-20 may generate complex symbols by encoding and modulating a transmit bit string. Also, during data reception, the baseband processor 1*i*-20 may reconstruct a received bit string by demodulating and decoding the baseband signal provided from the RF processor 1*i*-10. For example, according to the OFDM scheme, during data transmission, the baseband processor 1*i*-20 may generate complex symbols by encoding and modulating a transmit bit string, map the complex symbols to subcarriers, and then configure OFDM symbols through an IFFT operation and CP insertion. Also, during data reception, the baseband processor 1*i*-20 may segment the baseband signal provided from the RF processor 1*i*-10 into units of OFDM symbols, reconstruct signals mapped to the subcarriers through an FFT operation, and then reconstruct a received bit string through demodulation and decoding. The baseband processor 1*i*-20 and the RF processor 1*i*-10 may transmit and receive signals as described above. Accordingly, the baseband processor 1*i*-20 and the RF processor 1*i*-10 may be referred to as a transmitter, a receiver, a transceiver, a communicator, or a wireless communicator. The BS may transmit and receive signals to and from a UE by using the baseband processor 1*i*-20 and the RF processor 1*i*-10, and the signals may include control information and data.

The communicator 1*i*-30 may provide an interface for communicating with other nodes in the network. That is, the communicator 1*i*-30 may convert a bit string transmitted from a main BS to another node, for example, an auxiliary BS, a core network, etc., into a physical signal, and convert a physical signal received from the other node into a bit string. The communicator 1*i*-30 may be a backhaul communicator.

The storage 1*i*-40 may store data such as a basic program, an application program, or configuration information for operation of the BS. The storage 1*i*-40 may store information about a bearer allocated to a connected UE, a measurement result reported from the connected UE, and the like. The storage 1*i*-40 may further store information serving as a criterion for determining whether to provide multi-connection to the UE or stop the multi-connection. The storage 1*i*-40 may provide stored data in response to a request from the controller 1*i*-50. The storage 1*i*-40 may include a storage medium such as a ROM, a RAM, a hard disk, a CD-ROM, and a DVD, or a combination of storage mediums. Also, the storage 1*i*-40 may include a plurality of memories. According to some embodiments of the disclosure, the storage 1*i*-40 may store a program for a method in which a BS according to the disclosure detects and recovers a beam failure for a special cell (SpCell).

The controller 1*i*-50 controls overall operations of the BS. For example, the controller 1*i*-50 may transmit and receive signals through the baseband processor 1*i*-20 and the RF processor 1*i*-10 or through the communicator 1*i*-30. Also, the controller 1*i*-50 may write and read data to and from the storage 1*i*-40. For this purpose, the controller 1*i*-50 may include at least one processor. According to an embodiment of the disclosure, the controller 1*i*-50 may include a multi-connection processor 1*i*-52 that performs a process for operation in a multi-connection mode.

Also, at least one element of the BS may be implemented as a single chip. Furthermore, each element of the BS may operate to perform the above-described embodiments of the disclosure.

The methods according to the embodiments of the disclosure described in the claims or specification of the disclosure may be implemented by hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments of the disclosure set forth in the claims or specification.

Such programs (software modules or software) may be stored in RAM, non-volatile memory such as flash memory, ROM, electrically erasable programmable ROM (EEPROM), a magnetic disc storage device, CD-ROM, a DVD, other types of optical storage devices, or a magnetic cassette. Alternatively, the programs may be stored in a memory which is a combination of some or all of the above storage media. Also, a plurality of such memories may be provided.

In addition, the programs may be stored in an attachable storage device accessible through any or a combination of communication networks such as the Internet, an intranet, a local area network (LAN), a wide LAN (WLAN), and a storage area network (SAN). Such a storage device may be connected to a device performing embodiments of the disclosure through an external port. In addition, a separate storage device in a communication network may be connected to a device that performs embodiments of the disclosure.

The embodiments of the disclosure may provide a method and apparatus for operating DRX when a UE performs 2-step random access.

Although embodiments of the disclosure have been described in the detailed description of the disclosure, various modifications may be made therein without departing from the scope of the disclosure. Therefore, the scope of the disclosure is not limited to the embodiments of the disclosure described herein and should be defined by the claims and their equivalents. In other words, it is obvious to those skilled in the art that other modifications based on the technical spirit of the disclosure can be implemented. Furthermore, the respective embodiments of the disclosure may be used by being combined with each other, as necessary. For example, a BS and a UE may operate by combining some of the methods proposed in the disclosure. Also, although the aforementioned embodiments of the disclosure are proposed based on a 5G or NR system, modifications to the embodiments of the disclosure, which do not deviate from the scope of the disclosure, may be applicable to other systems such as an LTE, LTE-A, or LTE-A-Pro system, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal in a wireless communication system, the terminal comprising:
a transceiver; and
at least one processor configured to:
control the transceiver to receive, from a base station (BS), a radio resource control (RRC) reconfiguration message comprising a reconfiguration with synchronization,
control the transceiver to transmit, to the BS, a first message comprising a physical random access channel (PRACH), a physical uplink shared channel (PUSCH), and a cell radio network temporary identity (C-RNTI) medium access control (MAC) control element (CE) based on the reconfiguration with synchronization, control the transceiver to receive, from the BS, a first physical downlink control channel (PDCCH) and a physical downlink shared channel (PDSCH), wherein:
for the case when the BS receives the PRACH and does not receive the PUSCH, the first PDCCH is a PDCCH addressed to random access RNTI (RA-RNTI) and the PDSCH includes a fallback random access response (RAR); and
for the case when the BS receives the PUSCH, the first PDCCH is a PDCCH addressed to a C-RNTI corresponding to the C-RNTI MAC CE and the PDSCH includes an absolute timing advance command MAC CE,
determine that a RAR reception is successful based on at least one of the fallback RAR or the PDSCH,
when a discontinuous reception (DRX) is configured for the terminal via a RRC signalling, determine that an active time for the DRX includes a time while a second PDCCH indicating a new transmission addressed to the C-RNTI corresponding to the C-RNTI MAC CE has not been received after determining that the RAR reception is successful, and
monitor the second PDCCH during the active time.

2. The terminal of claim 1,
wherein the reconfiguration with synchronization comprises at least one of a terminal identity, timer information, or resource information for random access, and
wherein the resource information for random access comprises at least one of first dedicated resource information for contention-free 4-step random access comprising first synchronization signal block (SSB) resource information, or second dedicated resource information for contention-free 2-step random access comprising second SSB resource information and resource information for the PUSCH of the first message.

3. The terminal of claim 1, wherein the at least one processor is further configured to determine to perform a 2-step random access procedure:
when the terminal receives, from the BS, both resource information for 4-step random access and resource information for 2-step random access and first reference signal received power (RSRP) of downlink pathloss reference signal is above a first RSRP threshold configured by the BS,
when the terminal receives, from the BS, the resource information for 2-step random access and does not receive the resource information for 4-step random access, or
when the reconfiguration with synchronization includes dedicated resource information for contention-free 2-step random access.

4. The terminal of claim 1,
wherein the reconfiguration with synchronization comprises dedicated resource information for contention-free 4-step random access, and
wherein the at least one processor is further configured to determine to perform a 4-step random access procedure.

5. The terminal of claim 2,
wherein the reconfiguration with synchronization comprises second dedicated resource information for contention-free 2-step random access comprising second SSB resource information associated with a plurality of SSBs, and
wherein the at least one processor is further configured to:
identify whether at least one SSB with a second reference signal received power (RSRP) above a second RSRP threshold among the plurality of SSBs is available,
when the at least one SSB with the second RSRP above the second RSRP threshold among the plurality of SSBs is available, determine to perform contention-free random access, and
when the at least one SSB with the second RSRP above the second RSRP threshold among the plurality of SSBs is not available, determine to perform contention-based random access.

6. The terminal of claim 1, wherein the reconfiguration with synchronization indicates a handover command.

7. A base station (BS) in a wireless communication system, the BS comprising:
a transceiver; and
at least one processor configured to:
control the transceiver to transmit, to a terminal, a radio resource control (RRC) reconfiguration message comprising a reconfiguration with synchronization,
control the transceiver to receive, from the terminal, a first message comprising a cell radio network temporary identity (C-RNTI) medium access control (MAC) control element (CE) based on the reconfiguration with synchronization,
identify whether the BS receives at least one of a physical random access channel (PRACH) or a physical uplink shared channel (PUSCH) via the first message,
when the BS receives the PRACH and the PUSCH, control the transceiver to transmit, to the terminal, a third message comprising a first physical downlink control channel (PDCCH) and a physical downlink shared channel (PDSCH) comprising an absolute timing advance command MAC CE,
when the BS receives the PRACH and does not receive the PUSCH, control the transceiver to transmit, to the terminal, a fallback random access response (RAR), and
control the transceiver to transmit, to the terminal, a second PDCCH,
wherein the second PDCCH is received by the terminal configured with a discontinuous reception (DRX) during active time, and
wherein the active time comprises a time while the second PDCCH indicating a new transmission addressed to a C-RNTI corresponding to the C-RNTI MAC CE has not been received after determining by the terminal that a RAR reception is successful.

8. The BS of claim 7,
wherein the reconfiguration with synchronization comprises at least one of a terminal identity, timer information, or resource information for random access, and
wherein the resource information for random access comprises at least one of first dedicated resource information for contention-free 4-step random access comprising first synchronization signal block (SSB) resource information, or second dedicated resource information for contention-free 2-step random access comprising second SSB resource information and resource information for the PUSCH of the first message.

9. The BS of claim 7, wherein the terminal performs a 2-step random access procedure:
when the terminal receives, from the BS, both resource information for 4-step random access and resource information for 2-step random access and first reference signal received power (RSRP) of downlink pathloss reference signal is above a first RSRP threshold configured by the BS, when the terminal receives, from the BS, the resource information for 2-step random access and does not receive the resource information for 4-step random access, or when the reconfiguration with synchronization comprises dedicated resource information for contention-free 2-step random access.

10. The BS of claim 7, wherein the terminal performs a 4-step random access procedure when the reconfiguration with synchronization includes dedicated resource information for contention-free 4-step random access.

11. The BS of claim 8,
wherein the reconfiguration with synchronization comprises second dedicated resource information for contention-free 2-step random access comprising second SSB resource information associated with a plurality of SSBs,
wherein the terminal performs contention-free random access when at least one SSB with a second RSRP above a second RSRP threshold among the plurality of SSBs is available, and
wherein the terminal performs contention-based random access when the at least one SSB with the second reference signal received power (RSRP) above the second RSRP threshold among the plurality of SSBs is not available.

12. The BS of claim 7, wherein the reconfiguration with synchronization indicates a handover command.

13. A method, performed by a terminal, in a wireless communication system, the method comprising:
receiving, from a base station (BS), a radio resource control (RRC) reconfiguration message comprising a reconfiguration with synchronization;
transmitting, to the BS, a first message comprising a physical random access channel (PRACH), a physical uplink shared channel (PUSCH), and a cell radio network temporary identity (C-RNTI) medium access control (MAC) control element (CE) based on the reconfiguration with synchronization,
receiving, from the BS, a first physical downlink control channel (PDCCH) and a physical downlink shared channel (PDSCH), wherein:
for the case when the BS receives the PRACH and does not receive the PUSCH, the first PDCCH is a PDCCH addressed to random access RNTI (RA-RNTI) and the PDSCH includes a fallback random access response (RAR); and
for the case when the BS receives the PUSCH, the first PDCCH is a PDCCH addressed to a C-RNTI corresponding to the C-RNTI MAC CE and the PDSCH includes an absolute timing advance command MAC CE,
determining that a RAR reception is successful based on at least one of the fallback RAR or the PDSCH;
when a discontinuous reception (DRX) is configured for the terminal via a RRC signalling, determining that active time for the DRX includes a time while a second PDCCH indicating new transmission addressed to the C-RNTI corresponding to the C-RNTI MAC CE has not been received after determining that the RAR reception is successful; and
monitoring the second PDCCH during the active time.

14. The method of claim 13,
wherein the reconfiguration with synchronization comprises at least one of a terminal identity, timer information, or resource information for random access, and wherein the resource information for random access comprises at least one of first dedicated resource information for contention-free 4-step random access comprising first synchronization signal block (SSB) resource information, or second dedicated resource information for contention-free 2-step random access comprising second SSB resource information and resource information for the PUSCH of the first message.

15. The method of claim 13, further comprising determining to perform a 2-step random access procedure:
when the terminal receives, from the BS, both resource information for 4-step random access and resource information for 2-step random access and first reference signal received power (RSRP) of downlink pathloss reference signal is above a first RSRP threshold configured by the BS,
when the terminal receives, from the BS, the resource information for 2-step random access and does not receive the resource information for 4-step random access, or
when the reconfiguration with synchronization includes dedicated resource information for contention-free 2-step random access.

16. The method of claim 14,
wherein the reconfiguration with synchronization comprises second dedicated resource information for contention-free 2-step random access comprising second SSB resource information associated with a plurality of SSBs, and
wherein the method further comprises:
identifying whether at least one SSB with a second reference signal received power (RSRP) above a second RSRP threshold among the plurality of SSBs is available;
when the at least one SSB with the second RSRP above the second RSRP threshold among the plurality of SSBs is available, determining to perform contention-free random access; and
when the at least one SSB with the second RSRP above the second RSRP threshold among the plurality of SSBs is not available, determining to perform contention-based random access.

17. A method, performed by a base station (BS), in a wireless communication system, the method comprising:
transmitting, to a terminal, a radio resource control (RRC) reconfiguration message comprising a reconfiguration with synchronization;
receiving, from the terminal, a first message comprising a cell radio network temporary identity (C-RNTI) medium access control (MAC) control element (CE) based on the reconfiguration with synchronization;
identifying whether the BS receives at least one of a physical random access channel (PRACH) or a physical uplink shared channel (PUSCH) via the first message;
when the BS receives the PRACH and the PUSCH, transmitting, to the terminal, a third message comprising a first physical downlink control channel (PDCCH) and a physical downlink shared channel (PDSCH) comprising an absolute timing advance command MAC CE;
when the BS receives the PRACH and does not receive the PUSCH, transmitting, to the terminal, a fallback random access response (RAR); and
transmitting, to the terminal, a second PDCCH,
wherein the second PDCCH is received by the terminal configured with a discontinuous reception (DRX) during active time, and
wherein the active time comprises a time while the second PDCCH indicating new transmission addressed to a C-RNTI corresponding to the C-RNTI MAC CE has not been received after determining by the terminal that a RAR reception is successful.

18. The method of claim 17,
wherein the reconfiguration with synchronization comprises at least one of a terminal identity, timer information, or resource information for random access, and
wherein the resource information for random access comprises at least one of first dedicated resource information for contention-free 4-step random access comprising first synchronization signal block (SSB) resource information, or second dedicated resource information for contention-free 2-step random access comprising second SSB resource information and resource information for the PUSCH of the first message.

19. The method of claim 17, wherein the terminal performs a 2-step random access procedure:
when the terminal receives, from the BS, both resource information for 4-step random access and resource information for 2-step random access and first reference signal received power (RSRP) of downlink pathloss reference signal is above a first RSRP threshold configured by the BS;
when the terminal receives, from the BS, the resource information for 2-step random access and does not receive the resource information for 4-step random access; or
when the reconfiguration with synchronization includes dedicated resource information for contention-free 2-step random access.

20. The method of claim 17,
wherein the reconfiguration with synchronization comprises second dedicated resource information for contention-free 2-step random access comprises second SSB resource information associated with a plurality of SSBs,
wherein the terminal performs contention-free random access when at least one SSB with a second reference signal received power (RSRP) above a second RSRP threshold among the plurality of SSBs is available, and
wherein the terminal performs contention-based random access when the at least one SSB with the second RSRP above the second RSRP threshold among the plurality of SSBs is not available.

\* \* \* \* \*